US011956690B2

(12) United States Patent
Kung et al.

(10) Patent No.: US 11,956,690 B2
(45) Date of Patent: Apr. 9, 2024

(54) METHOD AND APPARATUS FOR MOBILITY PROCEDURE IN A WIRELESS COMMUNICATION SYSTEM

(71) Applicant: ASUSTek Computer Inc., Taipei (TW)

(72) Inventors: Yi-Hsuan Kung, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/375,153

(22) Filed: Jul. 14, 2021

(65) Prior Publication Data

US 2022/0046510 A1 Feb. 10, 2022

Related U.S. Application Data

(60) Provisional application No. 63/056,139, filed on Jul. 24, 2020, provisional application No. 63/068,665, (Continued)

(51) Int. Cl.
*H04W 36/32* (2009.01)
*H04L 5/00* (2006.01)
(Continued)

(52) U.S. Cl.
CPC ........... *H04W 36/32* (2013.01); *H04L 5/0051* (2013.01); *H04W 36/0058* (2018.08);
(Continued)

(58) Field of Classification Search
CPC ............. H04W 36/32; H04W 36/0061; H04W 36/00837; H04W 36/0077;
(Continued)

(56) References Cited

U.S. PATENT DOCUMENTS 9,161,285 B2 * 10/2015 Pani ...................... H04W 36/08
2015/0201356 A1 * 7/2015 Wang ................ H04W 74/0833
370/331
(Continued)

FOREIGN PATENT DOCUMENTS

CN 105103613 A 11/2015
CN 106576366 A 4/2017
(Continued)

OTHER PUBLICATIONS

Samsung: "Acquring MIB Upon Handover", 3GPP TSG-RANG2 104, R2-1816305, Spokane, USA, Nov. 12-16, 2018, 13 pages.
(Continued)

*Primary Examiner* — Ricardo H Castaneyra
(74) *Attorney, Agent, or Firm* — Cooper Legal Group LLC

(57) ABSTRACT

A method and apparatus are disclosed. In an example from the perspective of a User Equipment (UE), the UE receives, from a first cell, a first signaling indicative of one or more random access resources of a second cell. The UE receives, from the first cell, a second signaling indicative of switching a Special Cell (SpCell) of the UE to the second cell, wherein the second signaling comprises at least one of a Physical Downlink Control Channel (PDCCH) signaling or a Medium Access Control (MAC) Control Element (CE). The UE initiates a random access procedure on the second cell in response to receiving the second signaling, wherein the random access procedure is performed by the UE using the one or more random access resources.

22 Claims, 18 Drawing Sheets

Related U.S. Application Data filed on Aug. 21, 2020, provisional application No. 63/068,698, filed on Aug. 21, 2020, provisional application No. 63/074,588, filed on Sep. 4, 2020.

(51) Int. Cl.
*H04W 36/00* (2009.01)
*H04W 74/00* (2009.01)
*H04W 74/0833* (2024.01)

(52) U.S. Cl.
CPC .............. *H04W 36/0061* (2013.01); *H04W 36/00837* (2018.08); *H04W 74/006* (2013.01); *H04W 74/0841* (2013.01)

(58) Field of Classification Search
CPC ............ H04W 36/0072; H04W 36/04; H04W 36/08; H04W 74/006; H04W 74/0841; H04W 74/0833; H04W 74/0866; H04W 72/042; H04W 36/0058; H04W 36/0011; H04W 72/23; H04L 5/0051; H04L 5/0032; H04L 5/0023; H04L 5/0048; H04L 5/0091; H04B 7/0695
See application file for complete search history.

(56) References Cited

U.S. PATENT DOCUMENTS

| | | | |
|---|---|---|---|
| 2015/0215826 | A1 | 7/2015 | Yamada |
| 2015/0215965 | A1* | 7/2015 | Yamada ............... H04W 76/27 370/329 |
| 2016/0037562 | A1 | 2/2016 | Kim et al. |
| 2017/0238228 | A1 | 8/2017 | Zhang et al. |
| 2018/0220336 | A1 | 8/2018 | Hong et al. |
| 2018/0343595 | A1* | 11/2018 | da Silva ............ H04W 36/0077 |
| 2019/0014512 | A1 | 1/2019 | Rune et al. |
| 2020/0314716 | A1* | 10/2020 | Kim ................. H04W 36/0079 |
| 2020/0314721 | A1* | 10/2020 | Cheng ............... H04W 36/0016 |
| 2021/0076271 | A1* | 3/2021 | Jokela .................. H04W 36/36 |
| 2021/0378021 | A1* | 12/2021 | You ..................... H04W 74/002 |
| 2022/0030498 | A1* | 1/2022 | Futaki ................... H04W 36/08 |
| 2022/0124633 | A1* | 4/2022 | Hoshino ............. H04B 7/0634 |

FOREIGN PATENT DOCUMENTS

| | | |
|---|---|---|
| CN | 107454667 A | 12/2017 |
| CN | 107690163 A | 2/2018 |
| WO | 2020116938 A1 | 6/2020 |

OTHER PUBLICATIONS

HiSilicon Huawei: "Discussion on conditional PScell change", 3GPP TSG-RAN WG2 Meeting #108, R2-1915848, Reno, Nevada, USA, Nov. 18-22, 2019, 3 pages.
Corresponding Korean Patent Application No. 10-2021-0092300, Office Action dated Mar. 13, 2023, English translation, 9 pages.
Corresponding Chinese Patent Application No. 2021-10794818.5, Office Action dated Dec. 6, 2023, English translation, 22 pages.
Ericsson: Introduction of Option 3—Dual Connectivity with NR in E-UTRAN-RAN 3 Parts, 3GPP TSG-RAN WG3 Meeting #95bis, R3-171152, Spokane WA USA Apr. 3-7, 2017, 47 pages.

* cited by examiner

METHOD AND APPARATUS FOR MOBILITY PROCEDURE IN A WIRELESS COMMUNICATION SYSTEM

CROSS-REFERENCE TO RELATED APPLICATIONS

The present Application claims the benefit of U.S. Provisional Patent Application Ser. No. 63/056,139 filed on Jul. 24, 2020, the entire disclosure of which is incorporated herein in its entirety by reference. The present Application also claims the benefit of U.S. Provisional Patent Application Ser. No. 63/068,665 filed on Aug. 21, 2020, the entire disclosure of which is incorporated herein in its entirety by reference. The present Application also claims the benefit of U.S. Provisional Patent Application Ser. No. 63/068,698 filed on Aug. 21, 2020, the entire disclosure of which is incorporated herein in its entirety by reference. The present Application also claims the benefit of U.S. Provisional Patent Application Ser. No. 63/074,588 filed on Sep. 4, 2020, the entire disclosure of which is incorporated herein in its entirety by reference.

FIELD

This disclosure generally relates to wireless communication networks, and more particularly, to a method and apparatus for mobility procedure in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE receives, from a first cell, a first signaling indicative of one or more random access resources of a second cell. The UE receives, from the first cell, a second signaling indicative of switching a Special Cell (SpCell) of the UE to the second cell, wherein the second signaling comprises at least one of a Physical Downlink Control Channel (PDCCH) signaling or a Medium Access Control (MAC) Control Element (CE). The UE initiates a random access procedure on the second cell in response to receiving the second signaling, wherein the random access procedure is performed by the UE using the one or more random access resources.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: RP-193133 New WID: Further enhancements on MIMO for NR; 3GPP TS 38.300, V16.0.0, NR and NG-RAN Overall Description; 3GPP TS 38.321, V15.8.0, Medium Access Control (MAC) protocol specification; 3GPP TS 38.331, V16.0.0, Radio Resource Control (RRC) protocol specification; 3GPP TS 38.212, V16.2.0; 3GPP TS 38.321, V16.0.0, Medium Access Control (MAC) protocol specification; 3GPP TS 38.331, V16.1.0, Radio Resource Control (RRC) protocol specification. The standards and documents listed above are hereby expressly incorporated by reference in their entirety.

Figure 1:
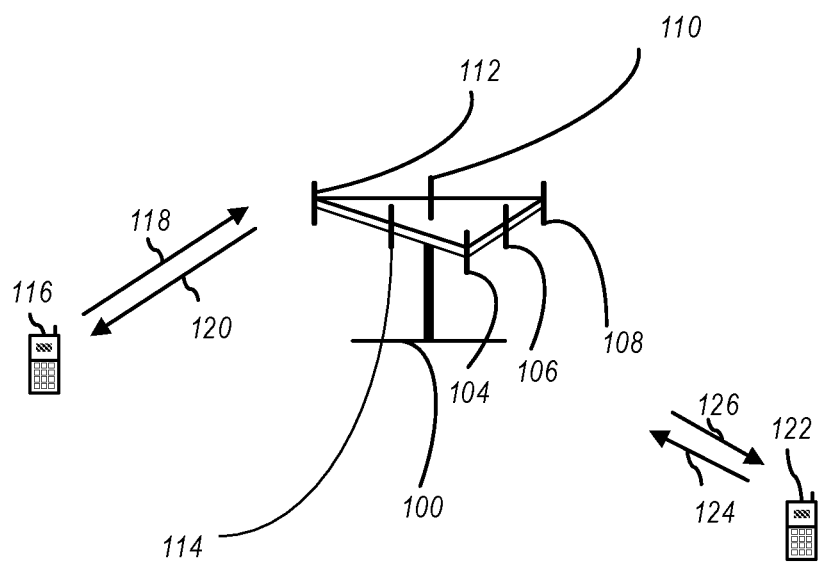
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
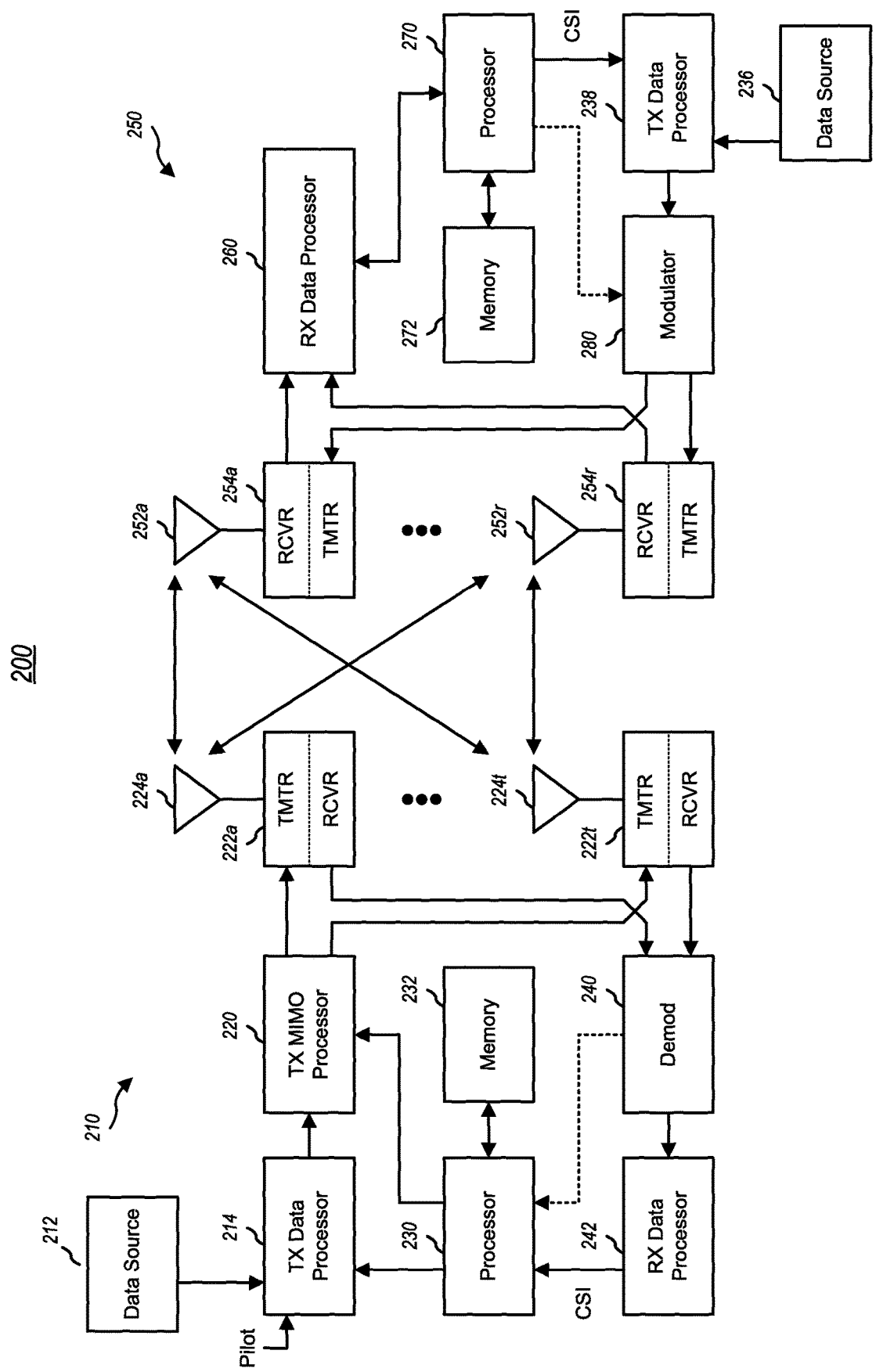
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
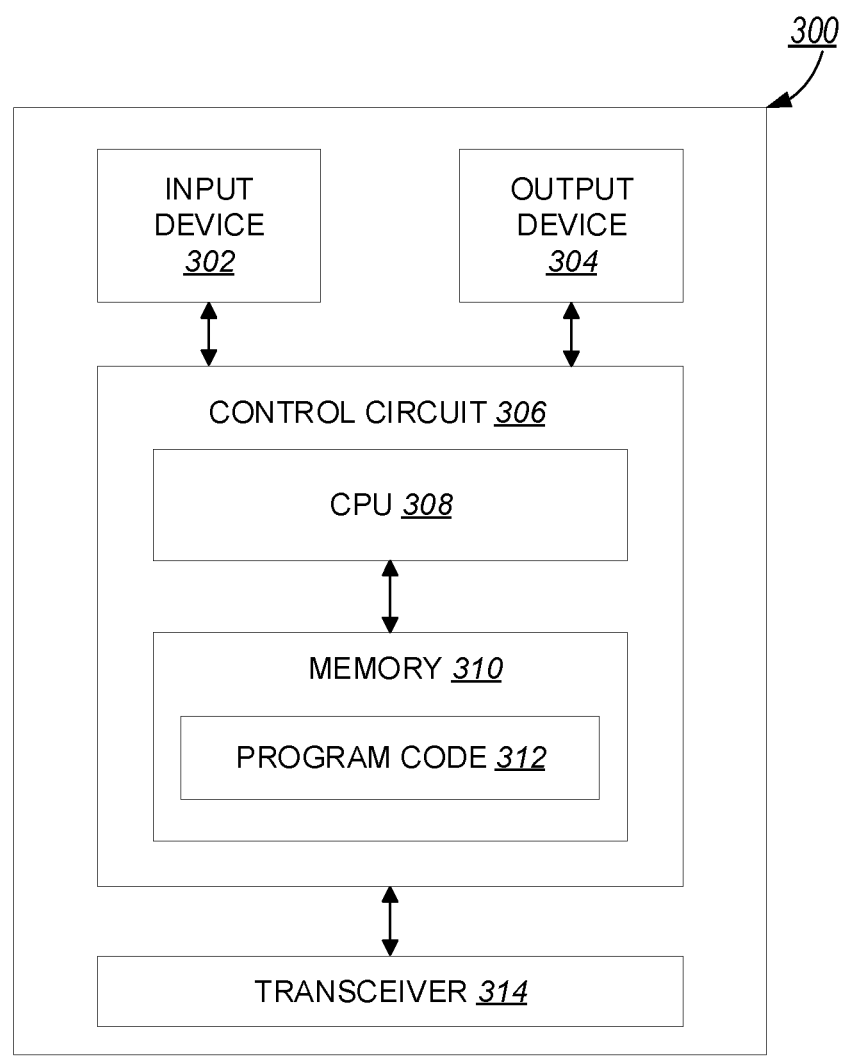
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
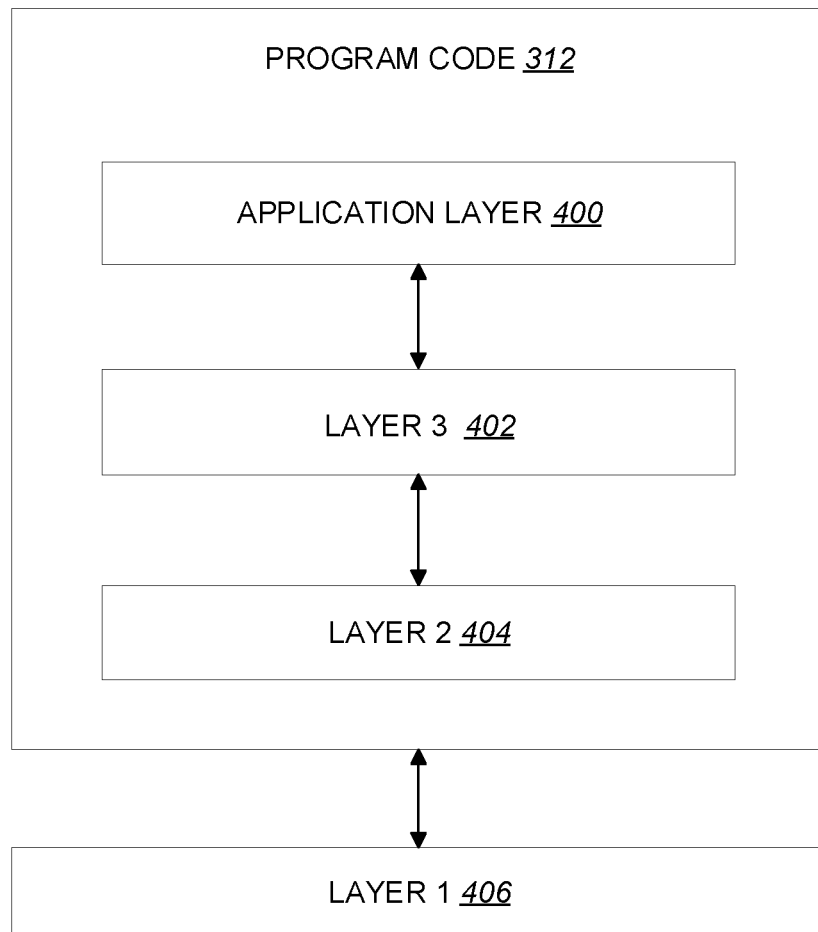
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

In work item description (WID) of further enhancements of multiple-input and multiple-output (MIMO) for NR in RP-193133 New WID, Layer 1 (L1)/Layer 2 (L2)-centric inter-cell mobility may be considered to be an objective. One or more parts of RP-193133 New WID are quoted below:

3 Justification

The Rel-15 NR includes a number of MIMO features that facilitate utilization of a large number of antenna elements at base station for both sub-6 GHz and over-6 GHz frequency bands. The Rel-16 NR enhances Rel-15 by introducing enhanced Type II codebook with DFT-based compression, support for multi-TRP transmission especially for eMBB and PDSCH, enhancements for multi-beam operation including reduction in latency and/or overhead for various reconfigurations (QCL-related, measurements), SCell beam failure recovery (BFR), and L1-SINR. In addition, low PAPR reference signals and features enabling uplink full-power transmission are also introduced.

As NR is in the process of commercialization, various aspects that require further enhancements can be identified from real deployment scenarios. Such aspects include the following. First, while Rel-16 manages to offer some reduction in overhead and/or latency, high-speed vehicular scenarios (e.g. a UE traveling at high speed on highways) at FR2 require more aggressive reduction in latency and overhead—not only for intra-cell, but also for L1/L2 centric inter-cell mobility. This also includes reducing the occurrence of beam failure events. Second, while enhancements for enabling panel-specific UL beam selection was investigated in Rel-16, there was not sufficient time to complete the work. This offers some potential for increasing UL coverage including, e.g. mitigating the UL coverage loss due to meeting the MPE (maximum permissible exposure) regulation. It is noted that MPE issue may occur on all transmit beams from the panel, therefore, a solution for MPE mitigation may only be performed per panel basis to meet the regulatory requirement for scenarios of interest.

Third, channels other than PDSCH can benefit from multi-TRP transmission (as well as multi-panel reception) which also includes multi-TRP for inter-cell operations. This includes some new use cases for multi-TRP such as UL dense deployment within a macro-cell and/or heterogeneous-network-type deployment scenarios. Fourth, due to the use of SRS for various scenarios, SRS can and should be further enhanced at least for capacity and coverage. Fifth, although Rel-16 supports enhanced Type II CSI, some room for further enhancements can be perceived. This includes CSI designed for multi-TRP/panel for NC-JT use case and the utilization of partial reciprocity on channel statistics such as angle(s) and delay(s) mainly targeting FR1 FDD deployments.

4 Objective 4.1 Objective of SI or Core Part WI or Testing Part WI

The work item aims to specify the further enhancements identified for NR MIMO. The detailed objectives are as follows:

Extend specification support in the following areas [RAN1]
1. Enhancement on multi-beam operation, mainly targeting FR2 while also applicable to FR1:
   a. Identify and specify features to facilitate more efficient (lower latency and overhead) DL/UL beam management to support higher intra- and L1/L2-centric inter-cell mobility and/or a larger number of configured TCI states:
      i. Common beam for data and control transmission/reception for DL and UL, especially for intra-band CA
      ii. Unified TCI framework for DL and UL beam indication
      iii. Enhancement on signaling mechanisms for the above features to improve latency and efficiency with more usage of dynamic control signaling (as opposed to RRC)
   b. Identify and specify features to facilitate UL beam selection for UEs equipped with multiple panels, considering UL coverage loss mitigation due to MPE, based on UL beam indication with the unified TCI framework for UL fast panel selection
   [ . . . ]

Figure 5:
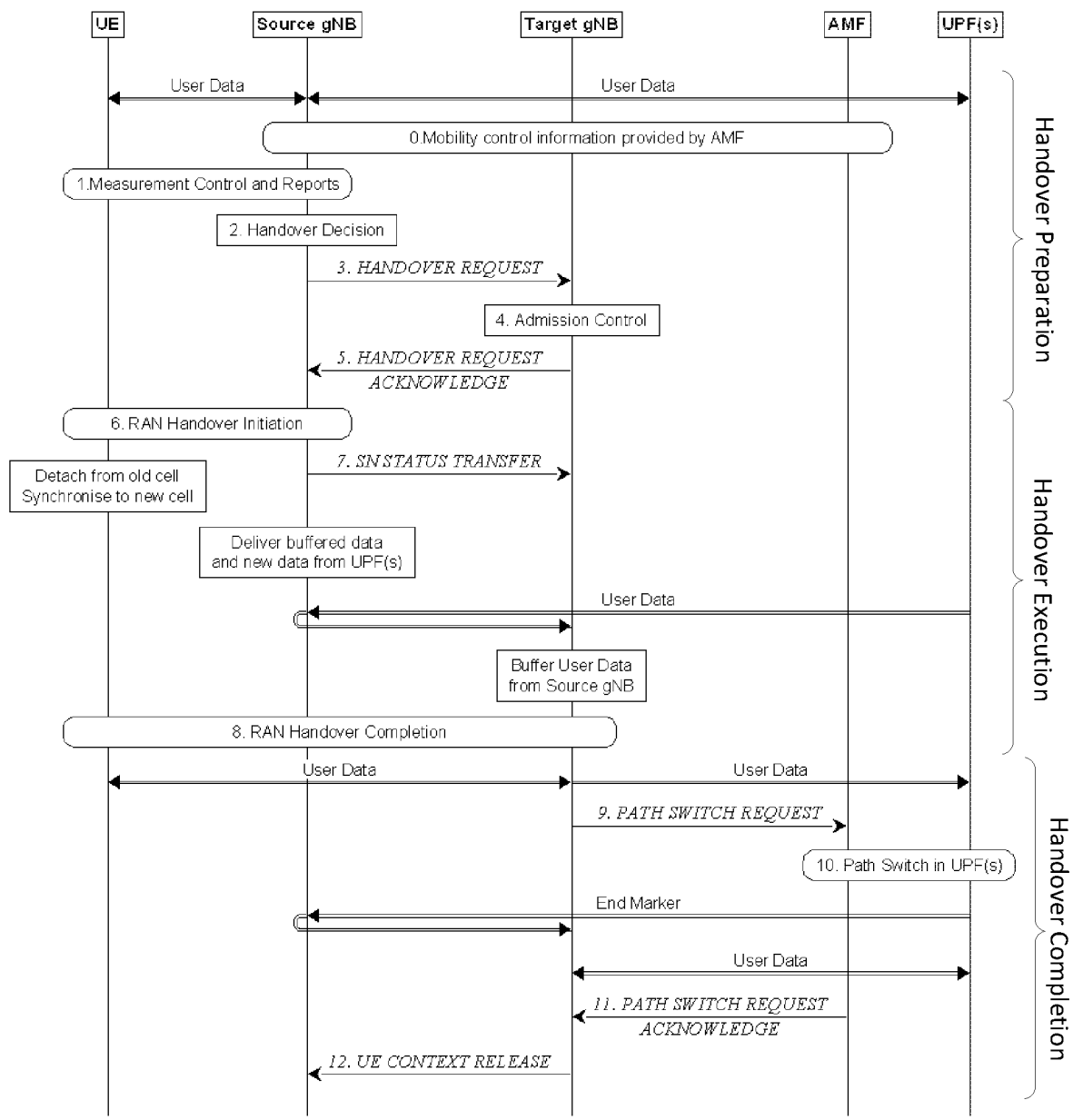
FIG. 5 is a diagram illustrating an exemplary scenario associated with intra-Access and Mobility Management Function (AMF)/user plane Function (UPF) handover according to one exemplary embodiment.

A description of reconfiguration with sync for NR is introduced in 3GPP TS 38.300, V16.0.0. Notably, FIG. 9.2.3.2.1-1 of Section 9.2.3.2.1 of 3GPP TS 38.300, V16.0.0, entitled "Intra-AMF/UPF Handover", is reproduced herein as FIG. 5. One or more parts of 3GPP TS 38.300, V16.0.0 are quoted below:

9.2.3.2 Handover 9.2.3.2.1 C-Plane Handling

Figure 9:
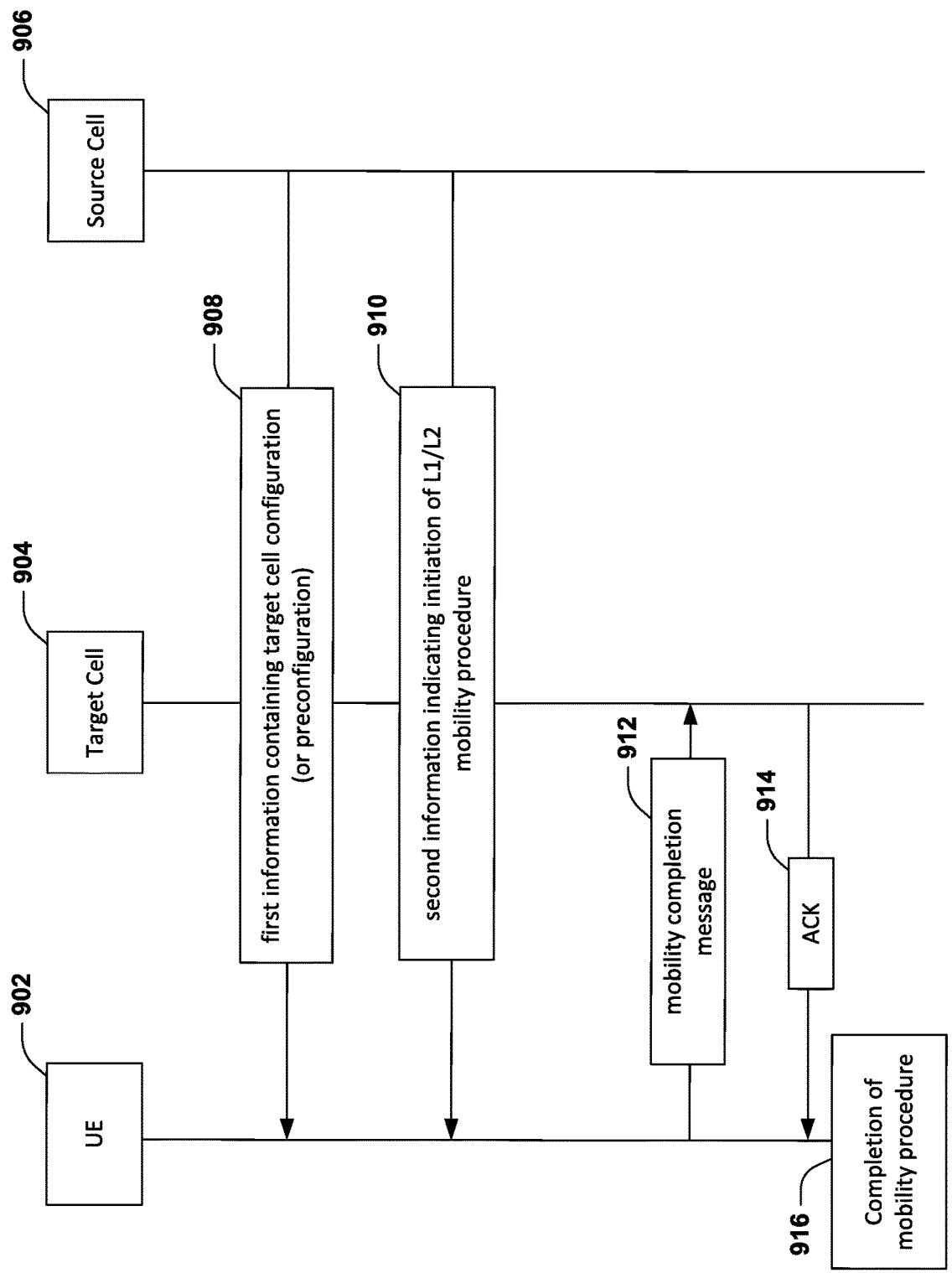
FIG. 9 is a diagram illustrating an exemplary scenario associated with a UE performing a mobility procedure according to one exemplary embodiment.

The intra-NR RAN handover performs the preparation and execution phase of the handover procedure performed without involvement of the 5GC, i.e. preparation messages are directly exchanged between the gNBs. The release of the resources at the source gNB during the handover completion phase is triggered by the target gNB. The figure below depicts the basic handover scenario where neither the AMF nor the UPF changes:

FIG. 9.2.3.2.1-1: Intra-AMF/UPF Handover

0. The UE context within the source gNB contains information regarding roaming and access restrictions which were provided either at connection establishment or at the last TA update.
1. The source gNB configures the UE measurement procedures and the UE reports according to the measurement configuration.
2. The source gNB decides to handover the UE, based on MeasurementReport and RRM information.
3. The source gNB issues a Handover Request message to the target gNB passing a transparent RRC container with necessary information to prepare the handover at the target side. The information includes at least the target cell ID, KgNB*, the C-RNTI of the UE in the source gNB, RRM-configuration including UE inactive time, basic AS-configuration including antenna Info and DL Carrier Frequency, the current QoS flow to DRB mapping rules applied to the UE, the SIB1 from source gNB, the UE capabilities for different RATs, PDU session related information, and can include the UE reported measurement information including beam-related information if available. The PDU session related information includes the slice information and QoS flow level QoS profile(s).
NOTE: After issuing a Handover Request, the source gNB should not reconfigure the UE, including performing Reflective QoS flow to DRB mapping.
4. Admission Control may be performed by the target gNB. Slice-aware admission control shall be performed if the slice information is sent to the target gNB. If the PDU sessions are associated with non-supported slices the target gNB shall reject such PDU Sessions.
5. The target gNB prepares the handover with L1/L2 and sends the HANDOVER REQUEST ACKNOWLEDGE to the source gNB, which includes a transparent container to be sent to the UE as an RRC message to perform the handover.
6. The source gNB triggers the Uu handover by sending an RRCReconfiguration message to the UE, containing the information required to access the target cell: at least the target cell ID, the new C-RNTI, the target gNB security algorithm identifiers for the selected security algorithms. It can also include a set of dedicated RACH resources, the association between RACH resources and SSB(s), the association between RACH resources and UE-specific CSI-RS configuration(s), common RACH resources, and system information of the target cell, etc.
7. The source gNB sends the SN STATUS TRANSFER message to the target gNB.
8. The UE synchronises to the target cell and completes the RRC handover procedure by sending RRCReconfigurationComplete message to target gNB.
9. The target gNB sends a PATH SWITCH REQUEST message to AMF to trigger 5GC to switch the DL data path towards the target gNB and to establish an NG-C interface instance towards the target gNB.
10. 5GC switches the DL data path towards the target gNB. The UPF sends one or more "end marker" packets on the old path to the source gNB per PDU session/tunnel and then can release any U-plane/TNL resources towards the source gNB.
11. The AMF confirms the PATH SWITCH REQUEST message with the PATH SWITCH REQUEST ACKNOWLEDGE message.
12. Upon reception of the PATH SWITCH REQUEST ACKNOWLEDGE message from the AMF, the target gNB sends the UE CONTEXT RELEASE to inform the source gNB about the success of the handover. The source gNB can then release radio and C-plane related resources associated to the UE context. Any ongoing data forwarding may continue.

The RRM configuration can include both beam measurement information (for layer 3 mobility) associated to SSB(s) and CSI-RS(s) for the reported cell(s) if both types of measurements are available. Also, if CA is configured, the RRM configuration can include the list of best cells on each frequency for which measurement information is available. And the RRM measurement information can also include the beam measurement for the listed cells that belong to the target gNB.

The common RACH configuration for beams in the target cell is only associated to the SSB(s). The network can have dedicated RACH configurations associated to the SSB(s) and/or have dedicated RACH configurations associated to CSI-RS(s) within a cell. The target gNB can only include one of the following RACH configurations in the Handover Command to enable the UE to access the target cell:
 i) Common RACH configuration;
 ii) Common RACH configuration+Dedicated RACH configuration associated with SSB;
 iii) Common RACH configuration+Dedicated RACH configuration associated with CSI-RS.

The dedicated RACH configuration allocates RACH resource(s) together with a quality threshold to use them. When dedicated RACH resources are provided, they are prioritized by the UE and the UE shall not switch to contention-based RACH resources as long as the quality threshold of those dedicated resources is met. The order to access the dedicated RACH resources is up to UE implementation.

Random access procedure for NR is introduced in 3GPP TS 38.321, V15.8.0, one or more parts of which are quoted below:

5.1 Random Access Procedure 5.1.1 Random Access Procedure Initialization

The Random Access procedure described in this clause is initiated by a PDCCH order, by the MAC entity itself, or by RRC for the events in accordance with TS 38.300 [2]. There is only one Random Access procedure ongoing at any point in time in a MAC entity. The Random Access procedure on an SCell shall only be initiated by a PDCCH order with ra-PreambleIndex different from 0b000000.

NOTE 1: If a new Random Access procedure is triggered while another is already ongoing in the MAC entity, it is up to UE implementation whether to continue with the ongoing procedure or start with the new procedure (e.g. for SI request).

RRC configures the following parameters for the Random Access procedure:
 prach-ConfigurationIndex: the available set of PRACH occasions for the transmission of the Random Access Preamble;

preambleReceivedTargetPower: initial Random Access Preamble power;

rsrp-ThresholdSSB: an RSRP threshold for the selection of the SSB. If the Random Access procedure is initiated for beam failure recovery, rsrp-ThresholdSSB used for the selection of the SSB within candidateBeamRSList refers to rsrp-ThresholdSSB in BeamFailureRecoveryConfig IE;

rsrp-ThresholdCSI-RS: an RSRP threshold for the selection of CSI-RS. If the Random Access procedure is initiated for beam failure recovery, rsrp-ThresholdCSI-RS is equal to rsrp-ThresholdSSB in BeamFailureRecoveryConfig IE;

rsrp-ThresholdSSB-SUL: an RSRP threshold for the selection between the NUL carrier and the SUL carrier;

candidateBeamRSList: a list of reference signals (CSI-RS and/or SSB) identifying the candidate beams for recovery and the associated Random Access parameters;

recoverySearchSpaceId: the search space identity for monitoring the response of the beam failure recovery request;

powerRampingStep: the power-ramping factor;

powerRampingStepHighPriority: the power-ramping factor in case of prioritized Random Access procedure;

scalingFactorBI: a scaling factor for prioritized Random Access procedure;

ra-PreambleIndex: Random Access Preamble;

ra-ssb-OccasionMaskIndex: defines PRACH occasion(s) associated with an SSB in which the MAC entity may transmit a Random Access Preamble (see clause 7.4);

ra-OccasionList: defines PRACH occasion(s) associated with a CSI-RS in which the MAC entity may transmit a Random Access Preamble;

ra-PreambleStartIndex: the starting index of Random Access Preamble(s) for on-demand SI request;

preambleTransMax: the maximum number of Random Access Preamble transmission;

ssb-perRACH-OccasionAndCB-PreamblesPerSSB: defines the number of SSBs mapped to each PRACH occasion and the number of contention-based Random Access Preambles mapped to each SSB;

[ . . . ]

the set of Random Access Preambles and/or PRACH occasions for beam failure recovery request, if any;

the set of Random Access Preambles and/or PRACH occasions for reconfiguration with sync, if any;

ra-Response Window: the time window to monitor RA response(s) (SpCell only);

ra-ContentionResolutionTimer: the Contention Resolution Timer (SpCell only).

[ . . . ]

When the Random Access procedure is initiated on a Serving Cell, the MAC entity shall:

1> flush the Msg3 buffer;
1> set the PREAMBLE_TRANSMISSION COUNTER to 1;
1> set the PREAMBLE_POWER_RAMPING_COUNTER to 1;
1> set the PREAMBLE_BACKOFF to 0 ms;
1> if the carrier to use for the Random Access procedure is explicitly signalled:
   2> select the signalled carrier for performing Random Access procedure;
   2> set the PCMAX to $P_{CMAX,f,c}$ of the signalled carrier.
1> else if the carrier to use for the Random Access procedure is not explicitly signalled; and
   1> if the Serving Cell for the Random Access procedure is configured with supplementary uplink as specified in TS 38.331 [5]; and
   1> if the RSRP of the downlink pathloss reference is less than rsrp-ThresholdSSB-SUL:
      2> select the SUL carrier for performing Random Access procedure;
      2> set the PCMAX to $P_{CMAX,f,c}$ of the SUL carrier.
   1> else:
      2> select the NUL carrier for performing Random Access procedure;
      2> set the PCMAX to $P_{CMAX,f,c}$ of the NUL carrier.
1> perform the BWP operation as specified in clause 5.15;
1> set PREAMBLE_POWER_RAMPING_STEP to powerRampingStep;
1> set SCALING_FACTOR_BI to 1;
1> if the Random Access procedure was initiated for beam failure recovery (as specified in clause 5.17); and
1> if beamFailureRecoveryConfig is configured for the active UL BWP of the selected carrier:
   2> start the beamFailureRecoveryTimer, if configured;
   2> apply the parameters powerRampingStep, preambleReceivedTargetPower, and preambleTransMax configured in the beamFailureRecoveryConfig;
   2> if powerRampingStepHighPriority is configured in the beamFailureRecoveryConfig:
      3> set PREAMBLE_POWER_RAMPING_STEP to the powerRampingStepHighPriority.
   2> else:
      3> set PREAMBLE_POWER_RAMPING_STEP to powerRampingStep.
   2> if scalingFactorBI is configured in the beamFailureRecoveryConfig:
      3> set SCALING_FACTOR_BI to the scalingFactorBI.
1> else if the Random Access procedure was initiated for handover; and
1> if rach-ConfigDedicated is configured for the selected carrier:
   2> if powerRampingStepHighPriority is configured in the rach-ConfigDedicated:
      3> set PREAMBLE_POWER_RAMPING_STEP to the powerRampingStepHighPriority.
   2> if scalingFactorBI is configured in the rach-ConfigDedicated:
      3> set SCALING_FACTOR_BI to the scalingFactorBI.
1> perform the Random Access Resource selection procedure (see clause 5.1.2).

5.1.2 Random Access Resource Selection

The MAC entity shall:

1> if the Random Access procedure was initiated for beam failure recovery (as specified in clause 5.17); and
1> if the beamFailureRecoveryTimer (in clause 5.17) is either running or not configured; and
1> if the contention-free Random Access Resources for beam failure recovery request associated with any of the SSBs and/or CSI-RSs have been explicitly provided by RRC; and
1> if at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available:

2> select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;
2> if CSI-RS is selected, and there is no ra-PreambleIndex associated with the selected CSI-RS:
3> set the PREAMBLE_INDEX to a ra-PreambleIndex corresponding to the SSB in candidateBeamRSList which is quasi-colocated with the selected CSI-RS as specified in TS 38.214 [7].
2> else:
3> set the PREAMBLE_INDEX to a ra-PreambleIndex corresponding to the selected SSB or CSI-RS from the set of Random Access Preambles for beam failure recovery request.
1> else if the ra-PreambleIndex has been explicitly provided by PDCCH; and
1> if the ra-PreambleIndex is not 0b000000:
2> set the PREAMBLE_INDEX to the signalled ra-PreambleIndex;
2> select the SSB signalled by PDCCH.
1> else if the contention-free Random Access Resources associated with SSBs have been explicitly provided in rach-ConfigDedicated and at least one SSB with SS-RSRP above rsrp-ThresholdSSB amongst the associated SSBs is available:
2> select an SSB with SS-RSRP above rsrp-ThresholdSSB amongst the associated SSBs;
2> set the PREAMBLE_INDEX to a ra-PreambleIndex corresponding to the selected SSB.
1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:
2> select a CSI-RS with CSI-RSRP above rsrp-ThresholdCSI-RS amongst the associated CSI-RSs;
2> set the PREAMBLE_INDEX to a ra-PreambleIndex corresponding to the selected CSI-RS.
[ ... ]
1> else (i.e. for the contention-based Random Access preamble selection):
2> if at least one of the SSBs with SS-RSRP above rsrp-ThresholdSSB is available:
3> select an SSB with SS-RSRP above rsrp-ThresholdSSB.
2> else:
3> select any SSB.
[ ... ]
2> select a Random Access Preamble randomly with equal probability from the Random Access Preambles associated with the selected SSB and the selected Random Access Preambles group.
2> set the PREAMBLE_INDEX to the selected Random Access Preamble.
[ ... ]
1> else if an SSB is selected above:
2> determine the next available PRACH occasion from the PRACH occasions corresponding to the selected SSB permitted by the restrictions given by the ra-ssb-OccasionMaskIndex if configured or indicated by PDCCH (the MAC entity shall select a PRACH occasion randomly with equal probability amongst the consecutive PRACH occasions according to clause 8.1 of TS 38.213 [6], corresponding to the selected SSB; the MAC entity may take into account the possible occurrence of measurement gaps when determining the next available PRACH occasion corresponding to the selected SSB).
1> else if a CSI-RS is selected above:
2> if there is no contention-free Random Access Resource associated with the selected CSI-RS:
3> determine the next available PRACH occasion from the PRACH occasions, permitted by the restrictions given by the ra-ssb-OccasionMaskIndex if configured, corresponding to the SSB in candidateBeamRSList which is quasi-colocated with the selected CSI-RS as specified in TS 38.214 [7] (the MAC entity shall select a PRACH occasion randomly with equal probability amongst the consecutive PRACH occasions according to clause 8.1 of TS 38.213 [6], corresponding to the SSB which is quasi-colocated with the selected CSI-RS; the MAC entity may take into account the possible occurrence of measurement gaps when determining the next available PRACH occasion corresponding to the SSB which is quasi-colocated with the selected CSI-RS).
2> else:
3> determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).
1> perform the Random Access Preamble transmission procedure (see clause 5.1.3).
[ ... ]

5.1.3 Random Access Preamble Transmission

The MAC entity shall, for each Random Access Preamble:
[ ... ]
1> instruct the physical layer to transmit the Random Access Preamble using the selected PRACH occasion, corresponding RA-RNTI (if available), PREAMBLE_INDEX and PREAMBLE_RECEIVED_TARGET_POWER.
[ ... ]

5.1.4 Random Access Response Reception

Once the Random Access Preamble is transmitted and regardless of the possible occurrence of a measurement gap, the MAC entity shall:
1> if the contention-free Random Access Preamble for beam failure recovery request was transmitted by the MAC entity:
2> start the ra-Response Window configured in BeamFailureRecoveryConfig at the first PDCCH occasion as specified in TS 38.213 [6] from the end of the Random Access Preamble transmission;
2> monitor for a PDCCH transmission on the search space indicated by recoverySearchSpaceId of the SpCell identified by the C-RNTI while ra-ResponseWindow is running 1> else:
  2> start the ra-Response Window configured in RACH-ConfigCommon at the first PDCCH occasion as specified in TS 38.213 [6] from the end of the Random Access Preamble transmission;
  2> monitor the PDCCH of the SpCell for Random Access Response(s) identified by the RA-RNTI while the ra-Response Window is running
1> if notification of a reception of a PDCCH transmission on the search space indicated by recoverySearchSpaceId is received from lower layers on the Serving Cell where the preamble was transmitted; and
1> if PDCCH transmission is addressed to the C-RNTI; and
1> if the contention-free Random Access Preamble for beam failure recovery request was transmitted by the MAC entity:
  2> consider the Random Access procedure successfully completed.
1> else if a downlink assignment has been received on the PDCCH for the RA-RNTI and the received TB is successfully decoded:
  2> if the Random Access Response contains a MAC subPDU with Backoff Indicator:
    3> set the PREAMBLE_BACKOFF to value of the BI field of the MAC subPDU using Table 7.2-1, multiplied with SCALING_FACTOR_BI.
  2> else:
    3> set the PREAMBLE_BACKOFF to 0 ms.
  2> if the Random Access Response contains a MAC subPDU with Random Access Preamble identifier corresponding to the transmitted PREAMBLE_INDEX (see clause 5.1.3):
    3> consider this Random Access Response reception successful.
  2> if the Random Access Response reception is considered successful:
    [ . . . ]
    4> apply the following actions for the Serving Cell where the Random Access Preamble was transmitted:
      5> process the received Timing Advance Command (see clause 5.2);
      5> indicate the preambleReceivedTargetPower and the amount of power ramping applied to the latest Random Access Preamble transmission to lower layers (i.e. (PREAMBLE_POWER_RAMPING_COUNTER−1)×PREAMBLE_POWER_RAMPING_STEP);
      5> if the Random Access procedure for an SCell is performed on uplink carrier where puschConfig is not configured:
        6> ignore the received UL grant.
      5> else:
        6> process the received UL grant value and indicate it to the lower layers.
    4> if the Random Access Preamble was not selected by the MAC entity among the contention-based Random Access Preamble(s):
      5> consider the Random Access procedure successfully completed.
    4> else:
      5> set the TEMPORARY_C-RNTI to the value received in the Random Access Response;
      5> if this is the first successfully received Random Access Response within this Random Access procedure:
        6> if the transmission is not being made for the CCCH logical channel:
          7> indicate to the Multiplexing and assembly entity to include a C-RNTI MAC CE in the subsequent uplink transmission.
        6> obtain the MAC PDU to transmit from the Multiplexing and assembly entity and store it in the Msg3 buffer.
[ . . . ]

5.1.5 Contention Resolution

Once Msg3 is transmitted, the MAC entity shall:
  1> start the ra-ContentionResolutionTimer and restart the ra-ContentionResolutionTimer at each HARQ retransmission in the first symbol after the end of the Msg3 transmission;
  1> monitor the PDCCH while the ra-ContentionResolutionTimer is running regardless of the possible occurrence of a measurement gap;
  1> if notification of a reception of a PDCCH transmission of the SpCell is received from lower layers:
    2> if the C-RNTI MAC CE was included in Msg3:
      3> if the Random Access procedure was initiated for beam failure recovery (as specified in clause 5.17) and the PDCCH transmission is addressed to the C-RNTI; or
      3> if the Random Access procedure was initiated by a PDCCH order and the PDCCH transmission is addressed to the C-RNTI; or
      3> if the Random Access procedure was initiated by the MAC sublayer itself or by the RRC sublayer and the PDCCH transmission is addressed to the C-RNTI and contains a UL grant for a new transmission:
        4> consider this Contention Resolution successful;
        4> stop ra-ContentionResolutionTimer;
        4> discard the TEMPORARY_C-RNTI;
        4> consider this Random Access procedure successfully completed.
    2> else if the CCCH SDU was included in Msg3 and the PDCCH transmission is addressed to its TEMPORARY_C-RNTI:
      3> if the MAC PDU is successfully decoded:
        4> stop ra-ContentionResolutionTimer;
        4> if the MAC PDU contains a UE Contention Resolution Identity MAC CE; and
        4> if the UE Contention Resolution Identity in the MAC CE matches the CCCH SDU transmitted in Msg3:
          5> consider this Contention Resolution successful and finish the disassembly and demultiplexing of the MAC PDU;
          5> if this Random Access procedure was initiated for SI request:
            6> indicate the reception of an acknowledgement for SI request to upper layers.
          5> else:
            6> set the C-RNTI to the value of the TEMPORARY_C-RNTI;
          5> discard the TEMPORARY_C-RNTI;
          5> consider this Random Access procedure successfully completed.

4> else:
    5> discard the TEMPORARY_C-RNTI;
    5> consider this Contention Resolution not successful and discard the successfully decoded MAC PDU.
[ . . . ]

5.1.6 Completion of the Random Access Procedure

Upon completion of the Random Access procedure, the MAC entity shall:
1> discard explicitly signalled contention-free Random Access Resources except contention-free Random Access Resources for beam failure recovery request, if any;
1> flush the HARQ buffer used for transmission of the MAC PDU in the Msg3 buffer.

Scheduling Request for NR is introduced in 3GPP TS 38.321, V16.0.0, one or more parts of which are quoted below:

5.4.4 Scheduling Request

The Scheduling Request (SR) is used for requesting UL-SCH resources for new transmission.
The MAC entity may be configured with zero, one, or more SR configurations. An SR configuration consists of a set of PUCCH resources for SR across different BWPs and cells. For a logical channel or for SCell beam failure recovery (see clause 5.17) and for consistent LBT failure (see clause 5.21), at most one PUCCH resource for SR is configured per BWP.
[ . . . ]

MAC reset for NR is introduced in 3GPP TS 38.321, V16.0.0, one or more parts of which are quoted below:

5.12 MAC Reset

If a reset of the MAC entity is requested by upper layers, the MAC entity shall:
1> initialize Bj for each logical channel to zero;
1> stop (if running) all timers;
1> consider all timeAlignmentTimers as expired and perform the corresponding actions in clause 5.2;
1> set the NDIs for all uplink HARQ processes to the value 0;
1> sets the NDIs for all HARQ process IDs to the value 0 for monitoring PDCCH in Sidelink resource allocation mode 1;
1> stop, if any, ongoing RACH procedure;
1> discard explicitly signalled contention-free Random Access Resources for 4-step RA type and 2-step RA type, if any;
1> flush Msg3 buffer;
1> flush MSGA buffer;
1> cancel, if any, triggered Scheduling Request procedure;
1> cancel, if any, triggered Buffer Status Reporting procedure;
1> cancel, if any, triggered Power Headroom Reporting procedure;
1> cancel, if any, triggered consistent LBT failure;
1> cancel, if any, triggered Sidelink Buffer Status Reporting procedure;
1> flush the soft buffers for all DL HARQ processes;
1> for each DL HARQ process, consider the next received transmission for a TB as the very first transmission;
1> release, if any, Temporary C-RNTI;
1> reset all BFI COUNTERs;
1> reset LBT COUNTER.

In 3GPP TS 38.331, such as 3GPP TS 38.331, V16.0.0 and 3GPP TS 38.331, V16.1.0, procedures and information elements involving handover (e.g. RRC reconfiguration, reconfiguration with sync) are introduced. One or more parts of 3GPP TS 38.331, such as 3GPP TS 38.331, V16.0.0 and/or 3GPP TS 38.331, V16.1.0, are quoted below:

3.1 Definitions

Special Cell: For Dual Connectivity operation the term Special Cell refers to the PCell of the MCG or the PSCell of the SCG, otherwise the term Special Cell refers to the PCell.

5.3.5 RRC Reconfiguration

5.3.5.3 Reception of an RRCReconfiguration by the UE

The UE shall perform the following actions upon reception of the RRCReconfiguration, or upon execution of the conditional reconfiguration (CHO or CPC):
1> if the RRCReconfiguration is applied due to a conditional reconfiguration execution upon cell selection while timer T311 is running, as defined in 5.3.7.3:
   2> remove all the entries within VarConditionalReconfig, if any;
[ . . . ]
1> if the RRCReconfiguration includes the masterCellGroup:
   2> perform the cell group configuration for the received masterCellGroup according to 5.3.5.5;
1> if the RRCReconfiguration includes the masterKeyUpdate:
   2> perform AS security key update procedure as specified in 5.3.5.7;
1> if the RRCReconfiguration includes the sk-Counter:
   2> perform security key update procedure as specified in 5.3.5.7;
1> if the RRCReconfiguration includes the secondaryCellGroup:
   2> perform the cell group configuration for the SCG according to 5.3.5.5;
[ . . . ]
1> if the RRCReconfiguration message includes the radioBearerConfig:
   2> perform the radio bearer configuration according to 5.3.5.6;
1> if the RRCReconfiguration message includes the radioBearerConfig2:
   2> perform the radio bearer configuration according to 5.3.5.6;
1> if the RRCReconfiguration message includes the measConfig:
   2> perform the measurement configuration procedure as specified in 5.5.2;
1> if the RRCReconfiguration message includes the dedicatedNAS-MessageList:
   2> forward each element of the dedicatedNAS-MessageList to upper layers in the same order as listed;
1> if the RRCReconfiguration message includes the dedicatedSIB1-Delivery:
   2> perform the action upon reception of SIB1 as specified in 5.2.2.4.2;
NOTE 0: If this RRCReconfiguration is associated to the MCG and includes reconfigurationWithSync in spCell- Config and dedicatedSIB1-Delivery, the UE initiates (if needed) the request to acquire required SIBs, according to clause 5.2.2.3.5, only after the random access procedure towards the target SpCell is completed.

1> if the RRCReconfiguration message includes the dedicatedSystemInformationDelivery:
   2> perform the action upon reception of System Information as specified in 5.2.2.4;
1> if the RRCReconfiguration message includes the dedicatedPosSysInfoDelivery:
   2> perform the action upon reception of the contained posSIB(s), as specified in sub-clause 5.2.2.4.16;
1> if the RRCReconfiguration message includes the otherConfig:
   2> perform the other configuration procedure as specified in 5.3.5.9;
[ . . . ]
   2> submit the RRCReconfigurationComplete message via SRB1 to lower layers for transmission using the new configuration;
   2> if this is the first RRCReconfiguration message after successful completion of the RRC re-establishment procedure:
     3> resume SRB2 and DRBs that are suspended;
1> if reconfigurationWithSync was included in spCellConfig of an MCG or SCG, and when MAC of an NR cell group successfully completes a Random Access procedure triggered above:
   2> stop timer T304 for that cell group;
   2> stop timer T310 for source SpCell if running;
   2> apply the parts of the CSI reporting configuration, the scheduling request configuration and the sounding RS configuration that do not require the UE to know the SFN of the respective target SpCell, if any;
   2> apply the parts of the measurement and the radio resource configuration that require the UE to know the SFN of the respective target SpCell (e.g. measurement gaps, periodic CQI reporting, scheduling request configuration, sounding RS configuration), if any, upon acquiring the SFN of that target SpCell;
   2> for each DRB configured as DAPS bearer, request uplink data switching to the PDCP entity, as specified in TS 38.323 [5];
   2> if the reconfigurationWithSync was included in spCellConfig of an MCG:
     3> if T390 is running:
        4> stop timer T390 for all access categories;
        4> perform the actions as specified in 5.3.14.4.
     3> if T350 is running:
        4> stop timer T350;
     3> if RRCReconfiguration does not include dedicatedSIB1-Delivery and
     3> if the active downlink BWP, which is indicated by the firstActiveDownlinkBWP-Id for the target SpCell of the MCG, has a common search space configured by searchSpaceSIB1:
        4> acquire the SIB1, which is scheduled as specified in TS 38.213 [13], of the target SpCell of the MCG;
        4> upon acquiring SIB1, perform the actions specified in clause 5.2.2.4.2;
   2> if the reconfigurationWithSync was included in spCellConfig of an MCG; or:
   2> if the reconfigurationWithSync was included in spCellConfig of an SCG and the CPC was configured
     3> remove all the entries within VarConditionalReconfig, if any;
     3> for each measId of the source SpCell configuration, if the associated reportConfig has a reportType set to condTriggerConfig:
        4> for the associated reportConfigId:
           5> remove the entry with the matching reportConfigId from the reportConfigList within the VarMeasConfig;
        4> if the associated measObjectId is only associated to a reportConfig with reportType set to cho-TriggerConfig:
           5> remove the entry with the matching measObjectId from the measObjectList within the VarMeasConfig;
        4> remove the entry with the matching measId from the measIdList within the VarMeasConfig;
[ . . . ]
   2> the procedure ends.

NOTE 3: The UE is only required to acquire broadcasted SIB1 if the UE can acquire it without disrupting unicast data reception, i.e. the broadcast and unicast beams are quasi co-located.

5.3.5.5 Cell Group Configuration

5.3.5.5.1 General

The network configures the UE with Master Cell Group (MCG), and zero or one Secondary Cell Group (SCG). In (NG)EN-DC, the MCG is configured as specified in TS 36.331 [10], and for NE-DC, the SCG is configured as specified in TS 36.331 [10]. The network provides the configuration parameters for a cell group in the CellGroupConfig IE.

The UE performs the following actions based on a received CellGroupConfig IE:

1> if the CellGroupConfig contains the spCellConfig with reconfigurationWithSync:
   2> perform Reconfiguration with sync according to 5.3.5.5.2;
   2> resume all suspended radio bearers and resume SCG transmission for all radio bearers, if suspended;
1> if the CellGroupConfig contains the rlc-BearerToReleaseList:
   2> perform RLC bearer release as specified in 5.3.5.5.3;
1> if the CellGroupConfig contains the rlc-BearerToAddModList:
   2> perform the RLC bearer addition/modification as specified in 5.3.5.5.4;
1> if the CellGroupConfig contains the mac-CellGroupConfig:
   2> configure the MAC entity of this cell group as specified in 5.3.5.5.5;
1> if the CellGroupConfig contains the sCellToReleaseList:
   2> perform SCell release as specified in 5.3.5.5.8;
1> if the CellGroupConfig contains the spCellConfig:
   2> configure the SpCell as specified in 5.3.5.5.7;
1> if the CellGroupConfig contains the sCellToAddModList:
   2> perform SCell addition/modification as specified in 5.3.5.5.9.

5.3.5.5.2 Reconfiguration with Sync

The UE shall perform the following actions to execute a reconfiguration with sync.
1> if the AS security is not activated, perform the actions upon going to RRC_IDLE as specified in 5.3.11 with the release cause 'other' upon which the procedure ends;
1> stop timer T310 for the corresponding SpCell, if running;
1> start timer T304 for the corresponding SpCell with the timer value set to t304, as included in the reconfigurationWithSync;
1> if the frequencyInfoDL is included:
  2> consider the target SpCell to be one on the SSB frequency indicated by the frequencyInfoDL with a physical cell identity indicated by the physCellId;
1> else:
  2> consider the target SpCell to be one on the SSB frequency of the source SpCell with a physical cell identity indicated by the physCellId;
1> start synchronising to the DL of the target SpCell;
1> apply the specified BCCH configuration defined in 9.1.1.1;
1> acquire the MIB, which is scheduled as specified in TS 38.213 [13];

NOTE 1: The UE should perform the reconfiguration with sync as soon as possible following the reception of the RRC message triggering the reconfiguration with sync, which could be before confirming successful reception (HARQ and ARQ) of this message.

NOTE 2: The UE may omit reading the MIB if the UE already has the required timing information, or the timing information is not needed for random access.

1> reset the MAC entity of this cell group;
1> consider the SCell(s) of this cell group, if configured, to be in deactivated state;
1> apply the value of the newUE-Identity as the C-RNTI for this cell group;
1> configure lower layers in accordance with the received spCellConfigCommon;
1> configure lower layers in accordance with any additional fields, not covered in the previous, if included in the received reconfigurationWithSync.

CellGroupConfig

The CellGroupConfig IE is used to configure a master cell group (MCG) or secondary cell group (SCG). A cell group comprises of one MAC entity, a set of logical channels with associated RLC entities and of a primary cell (SpCell) and one or more secondary cells (SCells).

CellGroupConfig information element

```
-- ASN1START
-- TAG-CELLGROUPCONFIG-START
-- Configuration of one Cell-Group:
CellGroupConfig ::=                            SEQUENCE {
    cellGroupId                                CellGroupId,
    rlc-BearerToAddModList                     SEQUENCE
(SIZE (1..maxLC-ID) OF RLC-BearerConfig           OPTIONAL,
-- Need N
    rlc-BearerToReleaseList                    SEQUENCE
(SIZE (1..maxLC-ID)) OF LogicalChannelIdentity    OPTIONAL,
-- Need N
    mac-CellGroupConfig                        MAC-CellGroupConfig
OPTIONAL, -- Need M
    physicalCellGroupConfig                    PhysicalCellGroupConfig
OPTIONAL, -- Need M
    spCellConfig                               SpCellConfig
OPTIONAL, -- Need M
    sCellToAddModList                          SEQUENCE (SIZE
(1..maxNrofSCells)) OF SCellConfig                OPTIONAL, --
Need N
    sCellToReleaseList                         SEQUENCE (SIZE
(1..maxNrofSCells)) OF SCellIndex                 OPTIONAL, --
Need N
[...]
-- Serving cell specific MAC and PHY parameters for a SpCell:
SpCellConfig ::=                               SEQUENCE {
    servCellIndex                              ServCellIndex
OPTIONAL, -- Cond SCG
    reconfigurationWithSync                    ReconfigurationWithSync
OPTIONAL, -- Cond ReconfWithSync
    rlf-TimersAndConstants                     SetupRelease { RLF-
TimersAndConstants }                              OPTIONAL, -- Need M
    rlmInSyncOutOfSyncThreshold                ENUMERATED {n1}
OPTIONAL, -- Need S
    spCellConfigDedicated                      ServingCellConfig
OPTIONAL, -- Need M
    ...
}
ReconfigurationWithSync ::=                    SEQUENCE {
    spCellConfigCommon                         ServingCellConfigCommon
OPTIONAL,  -- Need M
    newUE-Identity                             RNTI-Value,
    t304                                       ENUMERATED {ms50, ms100,
ms150, ms200, ms500, ms1000, ms2000, ms10000},
```

| CellGroupConfig information element | |
| --- | --- |
| rach-ConfigDedicated<br>  uplink<br>  supplementaryUplink<br>}<br>OPTIONAL, -- Need N<br>...,<br>[[<br>smtc<br>OPTIONAL -- Need S<br>]]<br>} | CHOICE {<br>  RACH-ConfigDedicated,<br>  RACH-ConfigDedicated<br><br><br><br><br>SSB-MTC |
| SCellConfig ::=<br>  sCellIndex<br>  sCellConfigCommon<br>OPTIONAL, -- Cond SCellAdd<br>  sCellConfigDedicated<br>OPTIONAL, -- Cond SCellAddMod<br>...,<br>[[<br>smtc<br>OPTIONAL -- Need S<br>]],<br>[[<br>sCellState-r16<br>OPTIONAL -- Need SCellAddSync<br>]]} | SEQUENCE {<br>  SCellIndex,<br>  ServingCellConfigCommon<br><br>  ServingCellConfig<br><br><br><br>SSB-MTC<br><br><br><br>ENUMERATED {activated} |

| CellGroupConfig field descriptions |
| --- |
| mac-CellGroupConfig<br>MAC parameters applicable for the entire cell group.<br>rlc-BearerToAddModList<br>Configuration of the MAC Logical Channel, the corresponding RLC entities and association with radio bearers.<br>sCellState<br>Indicates whether the SCell shall be considered to be in activated state upon SCell configuration.<br>sCellToAddModList<br>List of secondary serving cells (SCells) to be added or modified.<br>sCellToReleaseList<br>List of secondary serving cells (SCells) to be released. |

| CellGroupConfig field descriptions |
| --- |
| spCellConfig<br>Parameters for the SpCell of this cell group (PCell of MCG or PSCell of SCG). |

ServingCellConfigCommon

The IE ServingCellConfigCommon is used to configure cell specific parameters of a UE's serving cell. The IE contains parameters which a UE would typically acquire from SSB, MIB or SIBs when accessing the cell from IDLE. With this IE, the network provides this information in dedicated signalling when configuring a UE with a SCells or with an additional cell group (SCG). It also provides it for SpCells (MCG and SCG) upon reconfiguration with sync.

| ServingCellConfigCommon information element | |
| --- | --- |
| ServingCellConfigCommon ::=<br>  physCellId<br>OPTIONAL, -- Cond HOAndServCellAdd,<br>  downlinkConfigCommon<br>OPTIONAL, -- Cond HOAndServCellAdd<br>  uplinkConfigCommon<br>OPTIONAL -- Need M<br>  supplementaryUplinkConfig<br>OPTIONAL, -- Need S<br>  n-TimingAdvanceOffset<br>n39936 }<br>  ssb-PositionsInBurst<br>    shortBitmap<br>    mediumBitmap<br>    longBitmap<br>  }<br>OPTIONAL, -- Cond AbsFreqSSB<br>  ssb-periodicityServingCell<br>ms40, ms80, ms160, spare2, spare1 }<br>  dmrs-TypeA-Position<br>  lte-CRS-ToMatchAround | SEQUENCE {<br>  PhysCellId<br><br>  DownlinkConfigCommon<br><br>  UplinkConfigCommon<br><br>  UplinkConfigCommon<br><br>  ENUMERATED { n0, n25600,<br>  OPTIONAL, -- Need S<br>  CHOICE {<br>    BIT STRING (SIZE (4)),<br>    BIT STRING (SIZE (8)),<br>    BIT STRING (SIZE (64))<br><br><br><br>  ENUMERATED { ms5, ms10, ms20,<br>  OPTIONAL, -- Need S<br>  ENUMERATED {pos2, pos3},<br>  SetupRelease { |

| ServingCellConfigCommon information element | | |
|---|---|---|
| RateMatchPatternLTE-CRS } | | OPTIONAL, -- Need M |
| rateMatchPatternToAddModList (1..maxNrofRateMatchPatterns)) OF RateMatchPattern | SEQUENCE (SIZE | OPTIONAL, -- Need N |
| rateMatchPatternToReleaseList (1..maxNrofRateMatchPatterns)) OF RateMatchPatternId | SEQUENCE (SIZE | OPTIONAL, -- Need N |
| ssbSubcarrierSpacing OPTIONAL,-- Cond HOAndServCellWithSSB | SubcarrierSpacing | |
| tdd-UL-DL-ConfigurationCommon OPTIONAL, -- Cond TDD | TDD-UL-DL-ConfigCommon | |
| ss-PBCH-BlockPower [...] | INTEGER (−60..50), | |

| ServingCellConfigCommon field descriptions | |
|---|---|
| downlinkConfigCommon | |

The common downlink configuration of the serving cell, including the frequency information configuration and the initial downlink BWP common configuration. The parameters provided herein should match the parameters configured by MIB and SIB1 (if provided) of the serving cell, with the exception of controlResourceSetZero and searchSpaceZero which can be configured in ServingCellConfigCommon even if MIB indicates that they are absent.
[ . . . ]
ssb-PositionsInBurst
Indicates the time domain positions of the transmitted SS-blocks in a half frame with SS/PBCH blocks as defined in TS 38.213 [13], clause 4.1. The first/leftmost bit corresponds to SS/PBCH block index 0, the second bit corresponds to SS/PBCH block index 1, and so on. Value 0 in the bitmap indicates that the corresponding SS/PBCH block is not transmitted while value 1 indicates that the corresponding SS/PBCH block is transmitted. The network configures the same pattern in this field as in the corresponding field in ServingCellConfigCommonSIB. For operation with shared spectrum channel access, only mediumBitmap is used. The UE assumes that a bit at position k > ssb-PositionQCL is 0
ssbSubcarrierSpacing
Subcarrier spacing of SSB. Only the values 15 kHz or 30 kHz (FR1), and 120 kHz or 240 kHz (FR2) are applicable.
supplementaryUplinkConfig
The network configures this field only if uplinkConfigCommon is configured. If this field is absent, the UE shall release the supplementaryUplinkConfig and the supplementaryUplink configured in ServingCellConfig of this serving cell, if configured.
tdd-UL-DL-ConfigurationCommon
A cell-specific TDD UL/DL configuration, see TS 38.213 [13], clause 11.1.

| Conditional Presence | Explanation |
|---|---|
| HOAndServCellAdd | This field is mandatory present upon SpCell change and upon serving cell (PSCell/SCell) addition. Otherwise, the field is absent. |
| HOAndServCellWithSSB | This field is mandatory present upon SpCell change and upon serving cell (SCell with SSB or PSCell) addition. Otherwise, the field is absent. |

RACH-ConfigDedicated
The IE RACH-ConfigDedicated is used to specify the dedicated random access parameters.

| RACH-ConfigDedicated information element | |
|---|---|
| RACH-ConfigDedicated ::= | SEQUENCE { |
| cfra OPTIONAL, -- Need S | CFRA |
| ra-Prioritization OPTIONAL, -- Need N ..., [[ | RA-Prioritization |
| rachConfigDedicatedIAB-r16 OPTIONAL, -- Need S | RACH-ConfigDedicated-IAB-v16xy |
| ra-PrioritizationTwoStep-r16 OPTIONAL, -- Need N | RA-Prioritization |

| RACH-ConfigDedicated information element |
|---|

```
    cfra-TwoStep-r16                    CFRA-TwoStep-r16
OPTIONAL -- Need N
  ]]
}
CFRA ::=                                SEQUENCE {
  occasions                               SEQUENCE {
    rach-ConfigGeneric                      RACH-ConfigGeneric,
    ssb-perRACH-Occasion                    ENUMERATED {oneEighth,
oneFourth, oneHalf, one, two, four, eight, sixteen}
OPTIONAL -- Cond SSB-CFRA
  }
OPTIONAL, -- Need S
  resources                               CHOICE {
    ssb                                     SEQUENCE {
      ssb-ResourceList                        SEQUENCE (SIZE (1..maxRA-
SSB-Resources)) OF CFRA-SSB-Resource,
      ra-ssb-OccasionMaskIndex                INTEGER (0..15)
    },
    csirs                                   SEQUENCE {
      csirs-ResourceList                      SEQUENCE (SIZE (1..maxRA-
CSIRS-Resources)) OF CFRA-CSIRS-Resource,
      rsrp-ThresholdCSI-RS                    RSRP-Range
    }
  },
  ...,
  [[
  totalNumberOfRA-Preambles INTEGER (1..63)
OPTIONAL -- Cond Occasions
  ]]
}
CFRA-TwoStep-r16 ::=                    SEQUENCE {
  occasionsTwoStepRA-r16                  SEQUENCE {
    rach-ConfigGenericTwoStepRA-r16         RACH-ConfigGeneric,
    ssb-PerRACH-OccasionTwoStepRA-r16       ENUMERATED {oneEighth,
oneFourth, oneHalf, one,
                                            two, four,
eight, sixteen}                         OPTIONAL -- Cond SSB-CFRA
  }
OPTIONAL, -- Need S
  msgA-CFRA-PUSCH-r16                     MsgA-PUSCH-Config-r16,
  resourcesTwoStep-r16                    CHOICE {
    ssb                                     SEQUENCE {
      ssb-ResourceList                        SEQUENCE
(SIZE (1..maxRA-SSB-Resources)) OF CFRA-SSB-Resource,
      ra-ssb-OccasionMaskIndex                INTEGER (0..15)
    },
    csirs                                   SEQUENCE {
      csirs-ResourceList                      SEQUENCE
(SIZE (1..maxRA-CSIRS-Resources)) OF CFRA-CSIRS-Resource,
      rsrp-ThresholdCSI-RS                    RSRP-Range
    }
  },
  totalNumberOfTwoStepRA-Preambles-r16    INTEGER (1..62),
  ...
}
CFRA-SSB-Resource ::=                   SEQUENCE {
  ssb                                     SSB-Index,
  ra-PreambleIndex                        INTEGER (0..63),
  ...
}
CFRA-CSIRS-Resource ::=                 SEQUENCE {
  csi-RS                                  CSI-RS-Index,
  ra-OccasionList                         SEQUENCE (SIZE (1..maxRA-
OccasionsPerCSIRS)) OF INTEGER (0..maxRA-Occasions-1),
  ra-PreambleIndex                        INTEGER (0..63),
  ...
}
[...]
```

| CFRA-CSIRS-Resource field descriptions |
| --- |
| csi-RS<br>The ID of a CSI-RS resource defined in the measurement object associated with this serving cell.<br>ra-OccasionList<br>RA occasions that the UE shall use when performing CF-RA upon selecting the candidate beam identified by this CSI-RS. The network ensures that the RA occasion indexes provided herein are also configured by prach-ConfigurationIndex and msg1-FDM. Each RACH occasion is sequentially numbered, first, in increasing order of frequency resource indexes for frequency multiplexed PRACH occasions; second, in increasing order of time resource indexes for time multiplexed PRACH occasions within a PRACH slot and Third, in increasing order of indexes for PRACH slots.<br>ra-PreambleIndex<br>The RA preamble index to use in the RA occasions associated with this CSI-RS. |

| CFRA field descriptions |
| --- |
| occasions<br>RA occasions for contention free random access. If the field is absent, the UE uses the RA occasions configured in RACH-ConfigCommon in the first active UL BWP.<br>ra-ssb-OccasionMaskIndex<br>Explicitly signalled PRACH Mask Index for RA Resource selection in TS 38.321 [3]. The mask is valid for all SSB resources signalled in ssb-ResourceList.<br>rach-ConfigGeneric<br>Configuration of contention free random access occasions for CFRA. The UE shall ignore preambleReceivedTargetPower, preambleTransMax, powerRampingStep, ra-ResponseWindow signaled within this field and use the corresponding values provided in RACH-ConfigCommon.<br>ssb-perRACH-Occasion<br>Number of SSBs per RACH occasion.<br>totalNumberOfRA-Preambles<br>Total number of preambles used for contention free random access in the RACH resources defined in CFRA, excluding preambles used for other purposes (e.g. for SI request). If the field is absent but the field occasions is present, the UE may assume all the 64 preambles are for RA. The setting should be consistent with the setting of ssb-perRACH-Occasion, if present, i.e. it should be a multiple of the number of SSBs per RACH occasion. |

| CFRA-SSB-Resource field descriptions |
| --- |
| ra-PreambleIndex<br>The preamble index that the UE shall use when performing CF-RA upon selecting the candidate beams identified by this SSB.<br>ssb<br>The ID of an SSB transmitted by this serving cell. |

| CFRA-TwoStep field descriptions |
| --- |
| msgA-CFRA-PUSCH<br>PUSCH resource configuration(s) for msgA CFRA.<br>occasions TwoStepRA<br>RA occasions for contention free random access. If the field is absent, the UE uses the RA occasions configured in RACH-ConfigCommonTwoStepRA in the first active UL BWP.<br>ra-SSB-OccasionMaskIndex<br>Explicitly signalled PRACH Mask Index for RA Resource selection in TS 38.321 [3]. The mask is valid for all SSB resources signalled in ssb-ResourceList.<br>rach-ConfigGenericTwoStepRA<br>Configuration of contention free random access occasions for CFRA 2-step random access type. The UE shall ignore msgA-preambleReceivedTargetPower, preambleTransMax, msgA-powerRampingStep, msgB-ResponseWindow, msgA-TransMax signaled within this field and use the corresponding values provided in RACH-ConfigCommonTwoStepRA.<br>ssb-PerRACH-OccasionTwoStep<br>Number of SSBs per RACH occasion for 2-step random access type.<br>totalNumberOfTwoStepRA-Preambles<br>Total number of preambles used for contention free random access in the RACH resources defined in 2-step CFRA, excluding preambles used for other purposes (e.g. for SI request). If the field is absent but the field occasions is present, the UE may assume all the 64 preambles are for 2-step RA. The setting should be consistent with the setting of ssb-perRACH-OccasionTwoStep, if present, i.e. it should be a multiple of the number of SSBs per RACH occasion. |

| RACH-ConfigDedicated field descriptions |
|---|
| cfra<br>Parameters for contention free random access to a given target cell. If this field and cfra-TwoStep are absent, the UE performs contention based random access.<br>cfra-TwoStep<br>Parameters for contention free 2-step random access type to a given target cell. Network ensures that cfra and cfra-TwoStep are not configured at the same time.<br>[ . . . ]<br>ra-prioritization<br>Parameters which apply for prioritized random access procedure to a given target cell (see TS 38.321 [3], clause 5.1.1).<br>ra-PrioritizationTwoStep<br>Parameters which apply for prioritized 2-step random access type procedure to a given target cell (see TS 38.321 [3], clause 5.1.1). |

15

RACH-ConfigCommon
The IE RACH-ConfigCommon is used to specify the cell specific random-access parameters.

| RACH-ConfigCommon information element |
|---|
| ```
RACH-ConfigCommon ::=                           SEQUENCE {
  rach-ConfigGeneric                              RACH-ConfigGeneric,
  totalNumberOfRA-Preambles                       INTEGER (1..63)
OPTIONAL, -- Need S
  ssb-perRACH-OccasionAndCB-PreamblesPerSSB         CHOICE {
    oneEighth                                       ENUMERATED
{n4,n8,n12,n16,n20,n24,n28,n32,n36,n40,n44,n48,n52,n56,n60,n64},
    oneFourth                                       ENUMERATED
{n4,n8,n12,n16,n20,n24,n28,n32,n36,n40,n44,n48,n52,n56,n60,n64},
    oneHalf                                         ENUMERATED
{n4,n8,n12,n16,n20,n24,n28,n32,n36,n40,n44,n48,n52,n56,n60,n64},
    one                                             ENUMERATED
{n4,n8,n12,n16,n20,n24,n28,n32,n36,n40,n44,n48,n52,n56,n60,n64},
    two                                             ENUMERATED
{n4,n8,n12,n16,n20,n24,n28,n32},
    four                                            INTEGER (1..16),
    eight                                           INTEGER (1..8),
    sixteen                                         INTEGER (1..4)
  }
OPTIONAL, -- Need M
  groupBconfigured                                SEQUENCE {
    ra-Msg3SizeGroupA                               ENUMERATED {b56, b144,
b208, b256, b282, b480, b640,
                                                      b800, b1000,
b72, spare6, spare5,spare4, spare3, spare2, spare1},
    messagePowerOffsetGroupB                        ENUMERATED {
minusinfinity, dB0, dB5, dB8, dB10, dB12, dB15, dB18},
    numberOfRA-PreamblesGroupA                      INTEGER (1..64)
  }
OPTIONAL, -- Need R
  ra-ContentionResolutionTimer                    ENUMERATED { sf8, sf16,
sf24, sf32, sf40, sf48, sf56, sf64},
  rsrp-ThresholdSSB                               RSRP-Range
OPTIONAL, -- Need R
  rsrp-ThresholdSSB-SUL                           RSRP-Range
OPTIONAL, -- Cond SUL
  prach-RootSequenceIndex                         CHOICE {
    1839                                            INTEGER (0..837),
    1139                                            INTEGER (0..137)
  },
  msg1-SubcarrierSpacing                          SubcarrierSpacing
OPTIONAL, -- Cond L139
  restrictedSetConfig                             ENUMERATED
{unrestrictedSet, restrictedSetTypeA, restrictedSetTypeB},
  msg3-transformPrecoder                          ENUMERATED {enabled}
OPTIONAL, -- Need R
  ...,
  [[
  ra-PrioritizationForAccessIdentity              SEQUENCE {
    ra-Prioritization-r16                           RA-Prioritization,
    ra-PrioritizationForAI-r16                      BIT STRING (SIZE (2))
  }
``` |

| RACH-ConfigCommon information element |
|---|

```
OPTIONAL, -- Need R
    prach-RootSequenceIndex-r16         CHOICE {
        l571                                INTEGER (0..569),
        l1151                               INTEGER (0..1149)
    } OPTIONAL -- Need R
  ]]
}
```

| RACH-ConfigCommon field descriptions |
|---| messagePowerOffsetGroupB
Threshold for preamble selection. Value is in dB. Value minusinfinity corresponds to −infinity.
Value dB0 corresponds to 0 dB, dB5 corresponds to 5 dB and so on. (see TS 38.321 [3], clause
5.1.2)
msg1-SubcarrierSpacing
Subcarrier spacing of PRACH (see TS 38.211 [16], clause 5.3.2). Only the values 15 or 30 kHz
(FR1), and 60 or 120 kHz (FR2) are applicable. If absent, the UE applies the SCS as derived
from the prach-ConfigurationIndex in RACH-ConfigGeneric (see tables Table 6.3.3.1-1 and
Table 6.3.3.2-2, TS 38.211 [16]). The value also applies to contention free random access
(RACH-ConfigDedicated), to SI-request and to contention-based beam failure recovery (CB-
BFR). But it does not apply for contention free beam failure recovery (CF-BFR) (see
BeamFailureRecoveryConfig).
msg3-transformPrecoder
Enables the transform precoder for Msg3 transmission according to clause 6.1.3 of TS 38.214
[19]. If the field is absent, the UE disables the transformer precoder (see TS 38.213 [13], clause
8.3).
numberOfRA-PreamblesGroupA
The number of CB preambles per SSB in group A. This determines implicitly the number of CB
preambles per SSB available in group B. (see TS 38.321 [3], clause 5.1.1). The setting should
be consistent with the setting of ssb-perRACH-OccasionAndCB-PreamblesPerSSB.
prach-RootSequenceIndex
PRACH root sequence index (see TS 38.211 [16], clause 6.3.3.1). The value range depends on
whether L = 839 or L = 139. The short/long preamble format indicated in this IE should be
consistent with the one indicated in prach-ConfigurationIndex in the RACH-ConfigDedicated (if
configured). If prach-RootSequenceIndex-r16 is signalled, UE shall ignore the prach-
RootSequenceIndex (without suffix).
ra-ContentionResolutionTimer
The initial value for the contention resolution timer (see TS 38.321 [3], clause 5.1.5). Value sf8
corresponds to 8 subframes, value sf16 corresponds to 16 subframes, and so on.
ra-Msg3SizeGroupA
Transport Blocks size threshold in bits below which the UE shall use a contention-based RA
preamble of group A. (see TS 38.321 [3], clause 5.1.2).
ra-PrioritizationForAI
Indicates whether the the field ra-Prioritization-r16 applies for Access Identities. The
first/leftmost bit corresponds to Access Identity 1, the next bit corresponds to Access Identity 2.
Value 1 indicates that the field ra-Prioritization-r16 applies otherwise the field does not apply
(see TS 23.501 [32]).
ra-Prioritization
Parameters which apply for prioritized random access procedure for specific Access Identities
(see TS 38.321 [3], clause 5.1.1).
rach-ConfigGeneric
RACH parameters for both regular random access and beam failure recovery.
restrictedSetConfig
Configuration of an unrestricted set or one of two types of restricted sets, see TS 38.211 [16],
clause 6.3.3.1.
rsrp-ThresholdSSB
UE may select the SS block and corresponding PRACH resource for path-loss estimation and
(re)transmission based on SS blocks that satisfy the threshold (see TS 38.213 [13]).
rsrp-ThresholdSSB-SUL
The UE selects SUL carrier to perform random access based on this threshold (see TS 38.321
[3], clause 5.1.1). The value applies to all the BWPs.
ssb-perRACH-OccasionAndCB-PreamblesPerSSB
The meaning of this field is twofold: the CHOICE conveys the information about the number of
SSBs per RACH occasion. Value oneEight corresponds to one SSB associated with 8 RACH
occasions, value oneFourth corresponds to one SSB associated with 4 RACH occasions, and
so on. The ENUMERATED part indicates the number of Contention Based preambles per SSB.
Value n4 corresponds to 4 Contention Based preambles per SSB, value n8 corresponds to 8
Contention Based preambles per SSB, and so on. The total number of CB preambles in a
RACH occasion is given by CB-preambles-per-SSB* max(1, SSB-per-rach-occasion). See TS
38.213 [13].

-continued

RACH-ConfigCommon field descriptions totalNumberOfRA-Preambles
Total number of preambles used for contention based and contention free random access in the
RACH resources defined in RACH-ConfigCommon, excluding preambles used for other
purposes (e.g. for SI request). If the field is absent, all 64 preambles are available for RA. The
setting should be consistent with the setting of ssb-perRACH-OccasionAndCB-
PreamblesPerSSB, i.e. it should be a multiple of the number of SSBs per RACH occasion.

MAC-CellGroupConfig
The IE MAC-CellGroupConfig is used to configure MAC parameters for a cell group, including DRX.

| MAC-CellGroupConfig information element | |
| --- | --- |
| MAC-CellGroupConfig ::= | SEQUENCE { |
| drx-Config | SetupRelease { DRX-Config } |
| OPTIONAL, -- Need M | |
| schedulingRequestConfig | SchedulingRequestConfig |
| OPTIONAL, -- Need M | |
| bsr-Config | BSR-Config |
| OPTIONAL, -- Need M | |
| tag-Config | TAG-Config |
| OPTIONAL, -- Need M | |
| phr-Config | SetupRelease { PHR-Config } |
| OPTIONAL, -- Need M | |
| skipUplinkTxDynamic | BOOLEAN, |
| ..., | |
| [[ | |
| csi-Mask | BOOLEAN |
| OPTIONAL, -- Need M | |
| dataInactivityTimer | SetupRelease { |
| DataInactivityTimer } | OPTIONAL -- Cond MCG- |
| | Only |
| ]], | |
| [[ | |
| [...] | |

RLC-Config
The IE RLC-Config is used to specify the RLC configuration of SRBs and DRBs.
[ . . . ]
PDCP-Config
The IE PDCP-Config is used to set the configurable PDCP parameters for signalling and data radio bearers.
[ . . . ]
In 3GPP TS 38.212, V16.2.0, a Downlink Control Indicator (DCI) format for Physical Downlink Control Channel (PDCCH) order is introduced. One or more parts of 3GPP TS 38.212, V16.2.0 are quoted below:

7.3.1.2 DCI formats for Scheduling of PDSCH 7.3.1.2.1 Format 1_0

DCI format 1_0 is used for the scheduling of PDSCH in one DL cell.
The following information is transmitted by means of the DCI format 1_0 with CRC scrambled by C-RNTI or CS-RNTI or MCS-C-RNTI:
  Identifier for DCI formats—1 bits
    The value of this bit field is always set to 1, indicating a DL DCI format
  Frequency domain resource assignment—$\lceil \log_2(N_{RB}^{DL,BWP}(N_{RB}^{DL,BWP}+1)/2) \rceil$ bits where $N_{RB}^{DL,BWP}$ is given by clause 7.3.1.0
  If the CRC of the DCI format 1_0 is scrambled by C-RNTI and the "Frequency domain resource assignment" field are of all ones, the DCI format 1_0 is for random access procedure initiated by a PDCCH order, with all remaining fields set as follows:
  Random Access Preamble index—6 bits according to ra-PreambleIndex in Clause 5.1.2 of [8, TS38.321]
  UL/SUL indicator—1 bit. If the value of the "Random Access Preamble index" is not all zeros and if the UE is configured with supplementary Uplink in ServingCellConfig in the cell, this field indicates which UL carrier in the cell to transmit the PRACH according to Table 7.3.1.1.1-1; otherwise, this field is reserved
  SS/PBCH index—6 bits. If the value of the "Random Access Preamble index" is not all zeros, this field indicates the SS/PBCH that shall be used to determine the RACH occasion for the PRACH transmission; otherwise, this field is reserved.
  PRACH Mask index—4 bits. If the value of the "Random Access Preamble index" is not all zeros, this field indicates the RACH occasion associated with the SS/PBCH indicated by "SS/PBCH index" for the PRACH transmission, according to Clause 5.1.1 of [8, TS38.321]; otherwise, this field is reserved
  Reserved bits—12 bits for operation in a cell with shared spectrum channel access; otherwise 10 bits
[ . . . ]

In NR, a UE may perform a handover (HO) procedure to switch from one cell to another cell. The UE may perform the handover procedure in response to a Radio Resource Control (RRC) signaling transmitted by a network. The RRC signaling may comprise cell information of a target cell. The network determines to initiate the handover procedure based on one or more measurement reports of the UE. Switching between cells may take place more frequently when a UE is operating and/or performing communication in a frequency range, such as FR2 (e.g., 24.25 GHz to 52.6 GHz). Based on work item description (WID) of further enhancements of MIMO in RP-193133 New WID, inter-cell mobility considering Layer-1 and/or Layer-2 solution may reduce latency of the handover procedures.

Embodiments are provided herein for enabling performance of Layer-1 and/or Layer-2 handover procedures, and/or Layer-1 and/or Layer-2 mobility procedures.

A first concept of the present disclosure is that a first cell may transmit first information and second information to a UE. The first information may comprise one or more configurations of one or more cells comprising a second cell. The second information may indicate, to the UE, an identity and/or index associated with the second cell (and/or the second information may be indicative of other information in addition to the identity and/or the index). In some examples, the second information may not comprise and/or indicate the one or more configurations of the one or more cells (and/or the second information may not comprise and/or indicate a configuration of the second cell). The second information may indicate to (e.g., instruct) the UE to initiate a mobility procedure on the second cell. The UE may consider the second cell to be a Special Cell (SpCell), a Primary Cell (PCell), or a target cell (and/or a target SpCell) of the UE based on the second information (and/or in response to receiving the second information). The UE may initiate a mobility procedure in response to receiving the second information. The UE may not initiate the mobility procedure in response to receiving the first information. Alternatively and/or additionally, the UE may consider the second cell to be a SpCell or a PCell of the UE in response to completion of the mobility procedure (initiated in response to receiving the second information, for example). The UE may not consider the second Cell to be a SpCell of the UE in response to receiving the first information.

The first information and the second information may be transmitted in different signalings (e.g., the first information may be transmitted via a first signaling and/or the second information may be transmitted via a second signaling). The term "signaling" as used herein may correspond to at least one of a signal, a set of signals, a transmission, a message, etc.

The first information and the second information may be transmitted at different timings (e.g., the first information may be transmitted at a first timing and/or the second information may be transmitted at a second timing). The term "timing" as used herein may correspond to at least one of a time, a slot, a frame, a sub-frame, a time period, etc.

The one or more configurations may comprise a serving cell configuration (e.g., a configuration of a serving cell).

The one or more configurations may comprise a measurement configuration (e.g., a measurement object of a cell).

The one or more configurations may comprise a Medium Access Control (MAC) configuration (e.g., MAC-CellGroupConfig), a Radio Link Control (RLC) configuration (e.g., RLC-Config) and/or a Packet Data Convergence Protocol (PDCP) configuration (e.g., PDCP-Config) configuration (such as discussed in 3GPP TS 38.331, V16.0.0).

The one or more configurations may comprise one or more common Random Access Channel (RACH) configurations (e.g., RACH-ConfigCommon such as discussed in 3GPP TS 38.331, V16.0.0).

Alternatively and/or additionally, the second information may comprise one or more dedicated RACH configurations (e.g., RACH-ConfigDedicated such as discussed in 3GPP TS 38.331, V16.0.0).

The mobility procedure may comprise the UE triggering and/or generating a message and/or the UE transmitting the message to the second cell. The mobility procedure may comprise the UE initiating a random access procedure (e.g., a contention-free random access procedure) on the second cell. The random access procedure may be initiated in response to the message becoming available for transmission. The message may indicate completion of the mobility procedure. The mobility procedure may be used to switch a PCell (or a Primary Secondary Cell (PSCell)) of the UE to the second cell. In an example, before the mobility procedure, the PCell (or the PSCell) of the UE may be a cell (e.g., the first cell) different than the second cell. After completion (e.g., successful completion) of the mobility procedure, the PCell (or the PSCell) of the UE may be the second cell. The UE may consider the mobility procedure to be completed in response to completion of the random access procedure. The UE may consider the mobility procedure to be completed in response to receiving a positive acknowledgement associated with the message (from the second cell, for example). For example, the positive acknowledgement may indicate that the message is successfully transmitted and/or received.

Alternatively and/or additionally, if the second cell is a serving cell that is deactivated (e.g., a deactivated serving cell), the UE may activate the serving cell in response to receiving the second information.

The message may be a MAC Control Element (CE).

The message may be a RRC message.

The message may be a message different than a RRC message.

The message may be transmitted via Physical Uplink Control Channel (PUCCH) and/or Physical Uplink Shared Channel (PUSCH).

The message may comprise a Cell Radio Network Temporary Identifier (C-RNTI) MAC CE.

The message may comprise an identity of the UE.

The message may be a mobility completion message.

The first information may be indicative of one or more random access resources associated with the random access procedure on the second cell (e.g., the one or more random access resources may comprise all random access resources associated with the random access procedure on the second cell or a portion of random access resources associated with the random access procedure on the second cell). Alternatively and/or additionally, the first information may not be indicative of one or more random access resources associated with the random access procedure on the second cell (e.g., the one or more random access resources may comprise all random access resources associated with the random access procedure on the second cell or a portion of random access resources associated with the random access procedure on the second cell). Alternatively and/or additionally, the second information may be indicative of one or more random access resources associated with the random access procedure on the second cell (e.g., the one or more random access resources may comprise all random access resources associated with the random access procedure on the second cell or a portion of random access resources associated with the random access procedure on the second cell). Alternatively and/or additionally, the second information may not be indicative of one or more random access resources associated with the random access procedure on the second cell (e.g., the one or more random access resources may comprise all random access resources associated with the random access procedure on the second cell or a portion of random access resources associated with the random access procedure on the second cell).

The one or more random access resources may comprise a preamble (e.g., a contention-free preamble).

The one or more random access resources may comprise reference signal information (e.g., a Synchronization Signal Block (SSB) index and/or a Channel State Information Reference Signal (CSI-RS) index).

The one or more random access resources may comprise one or more Physical Random Access Channel (PRACH) occasions associated with the second cell.

The one or more random access resources may be rachConfigDedicated.

The one or more random access resources may comprise one or more preamble values, associated with the second cell, for the UE. In some examples, the preamble (and/or the one or more preamble values) may not be zero.

The one or more random access resources may comprise reference signal information associated with the second cell. The one or more random access resources may indicate one or more SSB indexes and/or one or more CSI-RS indexes.

The one or more random access resources may comprise one or more preambles associated with beam failure recovery procedure (e.g., contention-free beam failure recovery procedure) associated with the second cell. For example, the UE may perform a random access procedure for the mobility procedure on the second cell using a preamble for contention-free beam failure recovery procedure for the second cell.

The one or more random access resources may be provided and/or allocated by the second cell (e.g., the one or more random access resources may be provided and/or allocated, by the second cell, to the first cell). Alternatively and/or additionally, the one or more random access resources may be provided and/or allocated by the first cell.

Alternatively and/or additionally, the first information may be indicative of cell information (e.g., a cell configuration) of the second cell (e.g., the cell information may comprise all cell information of the second cell or a portion of cell information of the second cell). Alternatively and/or additionally, the second information may not be indicative of cell information (e.g., a cell configuration) of the second cell (e.g., the cell information may comprise all cell information of the second cell or a portion of cell information of the second cell). Alternatively and/or additionally, the second information may be indicative of cell information (e.g., a cell configuration) of the second cell (e.g., the cell information may comprise all cell information of the second cell or a portion of cell information of the second cell).

The cell information may comprise ServingCellConfigCommon (and/or information indicated as ServingCellConfigCommon) of the second cell.

The cell information may comprise an uplink configuration and/or a downlink configuration of the second cell.

The cell information may comprise a physical cell identity of the second cell. Alternatively and/or additionally, the cell information may comprise a serving cell index of the second cell.

The cell information may comprise a Radio Network Temporary Identifier (RNTI) value for the UE on the second cell (e.g., the RNTI value may comprise a newUE-Identity and/or a C-RNTI for the UE). For example, the UE may use the RNTI value on the second cell (for communication with the second cell, for example).

The cell information may comprise reference signal information associated with the second cell. For example, the cell information may indicate a Synchronisation Signal Block (SSB) index or a Channel State information (CSI) reference signal index associated with the second cell.

In an example, the first information may not indicate one or more random access resources for the UE to perform a random access procedure for the mobility procedure. The second information may be indicative of one or more random access resources, associated with the second cell, for the UE to perform random access procedure (e.g., the one or more random access resources may be used, by the UE, to perform the random access procedure). For example, in response to receiving the second information, the UE may perform the random access procedure on the second cell using one or more resources indicated by the second information (e.g., the one or more resources may comprise one, some and/or all of the one or more random access resources indicated by the second information).

In another example, the second information may not indicate one or more random access resources for the UE to perform a random access procedure associated with the second cell. The first information may indicate, to the UE, one or more random access resources associated with the second cell (e.g., the one or more random access resources may be used for one or more random access procedures). For example, in response to receiving the second information, the UE may perform a random access procedure on the second cell using one or more resources indicated by the first information (e.g., the one or more resources may comprise one, some and/or all of the one or more random access resources indicated by the first information).

In another example, the first information may indicate, to the UE, a preamble (e.g., a dedicated preamble) for the UE to use on the second cell. The second information may not indicate, to the UE, a preamble (e.g., any preamble) for the second cell. The UE may perform a random access procedure using the preamble indicated by the first information in response to receiving the second information.

In another example, the first information may indicate one or more preambles (associated with the second cell, for example), and the second information may be indicative of a preamble (e.g., one preamble) of the one or more preambles indicated by the first information (e.g., the second information may instruct the UE to use the preamble, of the one or more preambles indicated by the first information, for performing the random access procedure). In response to receiving the second information, the UE may perform a random access procedure using the preamble (e.g., the one preamble) indicated by the second information.

The second information may indicate (e.g., implicitly and/or explicitly indicate) a PRACH occasion for the UE to transmit the preamble (e.g., the second information may be indicative of a masking index for the UE to select the PRACH occasion and/or the second information may be indicative of a list of PRACH occasions comprising one or more PRACH occasions for the UE to transmit the preamble). Alternatively and/or additionally, the first information may indicate (e.g., implicitly and/or explicitly indicate) the PRACH occasion for the UE to transmit the preamble.

In an example, the first information may indicate, to the UE, one or more available PRACH occasions associated with a target cell (e.g., the second cell), and the second information may not indicate a PRACH occasion (e.g., any PRACH occasion) to the UE. In response to receiving the second information, the UE performs a random access procedure (e.g., a contention-free random access procedure) on the target cell by transmitting a preamble using a PRACH occasion (e.g., an available PRACH occasion) indicated by the first information (such as an available PRACH occasion of the one or more available PRACH occasions).

In another example, the first information may indicate, to the UE, one or more first available PRACH occasions associated with the target cell. The second information may indicate, to the UE, one or more second PRACH occasions, wherein the one or more second PRACH occasions may be a subset of the one or more first available PRACH occasions. In response to receiving the second information, the UE may transmit a preamble using a PRACH occasion indicated by the second information (e.g., an available PRACH occasion of the one or more second PRACH occasions).

In another example, the first information may not indicate available PRACH occasions associated with the second cell. The second information may indicate one or more available PRACH occasions to the UE (wherein a PRACH occasion of the one or more available PRACH occasions may be used to transmit a preamble in response to receiving the second information).

Alternatively and/or additionally, the first information and the second information may not provide resources to perform the random access procedure (e.g., the contention-free random access procedure). For example, the UE may perform a contention-based random access procedure on the second cell in response to receiving the second information.

The first information may be indicative of one or more serving cell configurations associated with one or more cells.

The first information may be indicative of beam information of the one or more cells. For example, for each cell of the one or more cells, the first information may be indicative of one or more reference signals of the cell.

The first information may be indicative of one or more C-RNTIs for the UE for the one or more cells. Alternatively and/or additionally, the first information may not indicate a RNTI value associated with the second cell for the UE, and the second information may indicate a RNTI value associated with the second cell for the UE.

The second information may be indicative of an identity of the second cell (e.g., the identity may comprise a physical cell index and/or a serving cell index). The one or more cells indicated by the first information may comprise the second cell.

In another example, the second information may be indicative of reference signal information associated with the second cell. For example, the second information may comprise a reference signal index (e.g., a SSB-Index and/or a CSI-RS-Index) associated with the second cell. The UE may perform a random access procedure based on a reference signal associated with the reference signal index.

Alternatively and/or additionally, the second information may not comprise reference signal information associated with the target cell. The first information may be indicative of reference signal information associated with the target cell. For example, the UE may perform a random access procedure on the target cell in response to receiving the second information and the UE may perform preamble transmission (via the random access procedure, for example) via a beam associated with the reference signal information indicated by the first information.

Alternatively and/or additionally, the second information may not comprise an uplink configuration (e.g., any uplink configuration) and/or a downlink configuration (e.g., any downlink configuration) of the target cell.

The reference signal information may be associated with a SSB and/or a CSI-RS.

The reference signal information may be indicated by (and/or may be indicative of) a SSB-Index and/or a CSI-RS-Index.

The reference signal information may be indicative of one or more preamble indexes for the second cell (and/or for one or more other cells in addition to the second cell).

The one or more cells may comprise one or more neighboring cells of the UE.

The one or more cells may comprise one or more serving cells of the UE. The one or more cells may comprise one or more deactivated serving cells of the UE and/or one or more activated serving cells of the UE.

The first information may be transmitted in a RRC message and/or signaling (e.g., the RRC message and/or signaling may comprise the first information).

The second information may be transmitted in a PDCCH signaling (e.g., the PDCCH signaling may comprise the second information).

The second information may be transmitted in a Physical Downlink Shared Channel (PDSCH) signaling (e.g., the PDSCH signaling may comprise the second information).

The second information may be transmitted in a Downlink Control Indicator (DCI) (e.g., the DCI may comprise the second information).

In some examples, the second information is not transmitted in a RRC message and/or signaling.

The first information and the second information may be transmitted in dedicated signalings (e.g., the first information may be transmitted via a first dedicated signaling that is directed and/or transmitted only to the UE and/or the second information may be transmitted via a second dedicated signaling that is directed and/or transmitted only to the UE).

In some examples, the second information is not a PDCCH order (e.g., the second information and/or a DCI comprising the second information may not use DCI format 1_0 such as discussed in 3GPP TS 38.212, V16.2.0). The second information may be (and/or may be comprised in) a DCI with a DCI format different from a PDCCH order (e.g., the DCI format of the DCI may be different than a DCI format of a PDCCH order). For example, when a UE receives a PDCCH order (and/or in response to the UE receiving the PDCCH order) indicating a random access procedure associated with a cell, the UE performs a random access procedure on the cell and may not consider the cell to be a SpCell. Alternatively and/or additionally, when the UE receives the second information associated with the second cell (and/or in response to the UE receiving the second information associated with the second cell), the UE may perform a mobility procedure (comprising initiating a random access procedure on the second cell, for example) and the UE may consider a cell (e.g., the second cell) to be a SpCell. The UE may determine whether or not to perform the mobility procedure based on a DCI format of a DCI. For example, the UE may perform the mobility procedure if the DCI (e.g., the second information) has a first DCI format and/or the UE may not perform the mobility procedure if the DCI (e.g., the second information) has a second DCI format (such as DCI format 1_0).

In some examples, the second information may be (and/or may be comprised in) a DCI comprising one or more fields. A field (of the one or more fields, for example) may indicate information associated with a target cell. In some examples, the information may comprise a physical cell identity of the target cell. Alternatively and/or additionally, the information may comprise a Secondary Cell (SCell) index of the target cell (if the target cell is a SCell, for example).

The second information may be transmitted in a MAC CE.

The second information may indicate (e.g., explicitly and/or implicitly indicate) that the UE should perform the mobility procedure on a cell (e.g., the second information may instruct the UE perform the mobility procedure on the cell).

For example, the second information may comprise an indicator. A UE may determine to perform a handover procedure (e.g., a Layer-1 and/or Layer-2 handover procedure) and/or a mobility procedure in response to receiving the second information comprising the indicator. For example, the UE may determine to perform the handover procedure and/or the mobility procedure based on the indicator being set to a value (e.g., a specific value and/or a configured value with which the UE is configured), such as 1, 2, 3, etc. For example, the UE may determine to perform the handover procedure and/or the mobility procedure in response to receiving the second information if the indicator associated with the second information is set to the value. Alternatively and/or additionally, the UE may not perform the handover or the mobility procedure in response to receiving a signaling if the received signaling does not comprise the indicator or if the received signaling comprises the indicator and the indicator is not set to the value.

In another example, the second information may indicate an identity of a cell. A UE may determine whether or not to perform a handover procedure (e.g., a Layer-1 and/or Layer-2 handover procedure) and/or a mobility procedure in response to receiving the second information based on one or more attributes of an identified cell (e.g., a cell identified by the second information, such as a cell for which an identity is indicated by the second information). In some examples, the UE may determine (in response to receiving the second information, for example) to perform a handover procedure (e.g., a Layer-1 and/or Layer-2 handover procedure) and/or a mobility procedure on the identified cell if the identified cell is a neighboring cell of the UE. Alternatively and/or additionally, the UE may not perform a mobility procedure on the identified cell if the identified cell is a serving cell (e.g., if the identified cell is an activated serving cell).

The indicator may be a field in a DCI. The indicator may be a field in a MAC CE.

Figure 6:
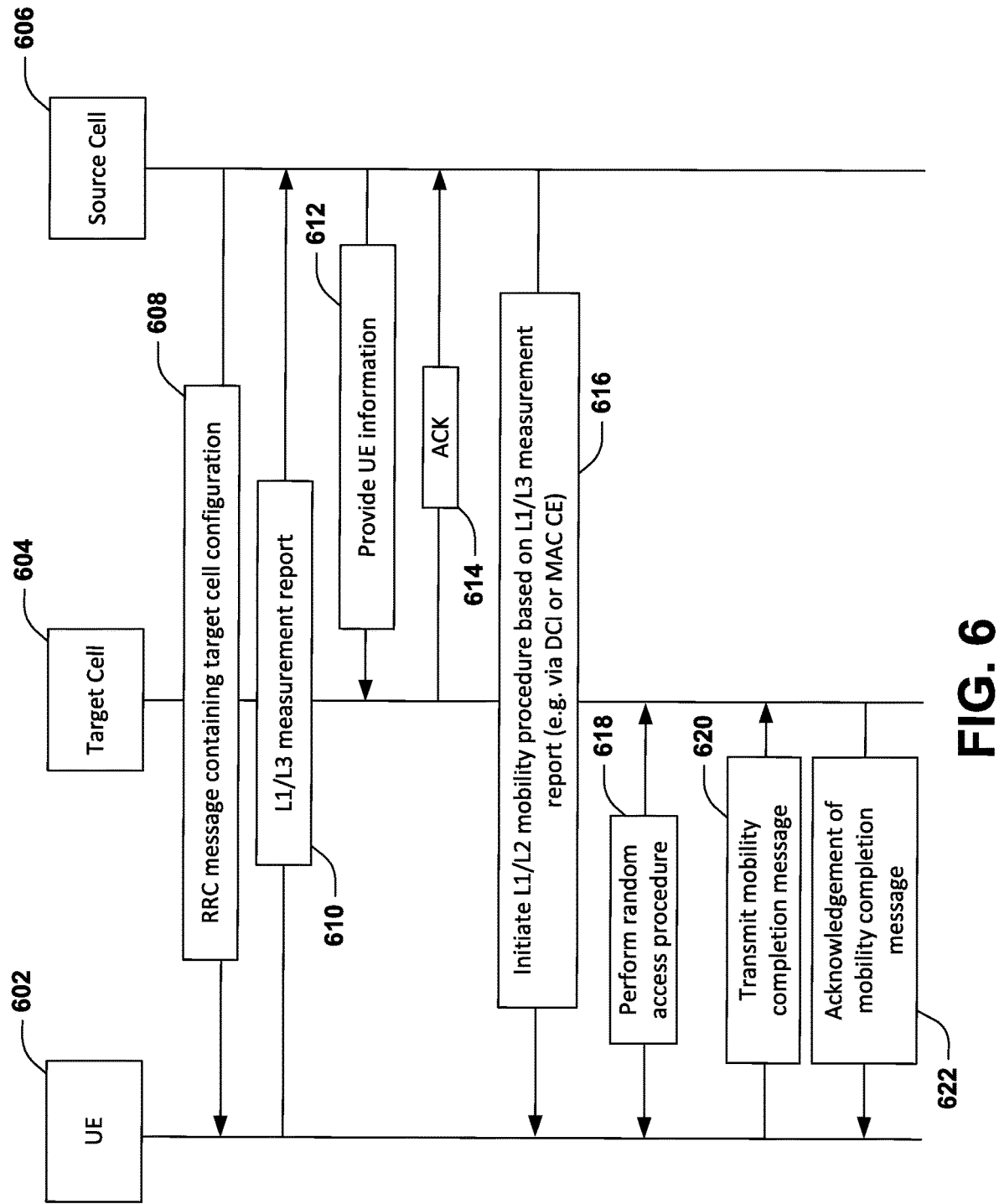
FIG. 6 is a diagram illustrating an exemplary scenario associated with a UE performing a mobility procedure according to one exemplary embodiment.

An example is shown in FIG. 6. A UE 602 performs communication with a Source Cell 606. For example, the UE 602 and/or the Source Cell 606 may establish an RRC connection in RRC_CONNECTED state and/or the UE 602 may perform communication with the Source Cell 606 via the established RRC connection. The Source Cell 606 may transmit 608 a RRC message comprising one or more configurations associated with a Target Cell 604 (and/or comprising one or more other configurations associated with one or more other cells in addition to the one or more configurations associated with the Target Cell). The Target Cell 604 may be a neighboring cell of the UE 602. Alternatively and/or additionally, the Target Cell 604 may be (and/or may be configured as) a Serving Cell (e.g., a deactivated Serving Cell) of the UE 602. The RRC message may be a RRCReconfiguration message. Alternatively and/or additionally, the RRC message may comprise one or more measurement configurations of the Target Cell 604. For example, the RRC message may comprise a measurement object addition associated with the Target Cell 604. The RRC message may comprise a channel state reporting configuration of the Target Cell 604. Alternatively and/or additionally, the RRC message may comprise random access resource information associated with the Target Cell 604. The random access resource information may comprise beam information (e.g., a SSB index and/or a CSI-RS index), a PRACH occasion, and/or a preamble index. The random access resource information may be provided (to the Source Cell 606, for example) by the Target Cell 604 before the transmission 608 of the RRC message. The UE 602 may store (and/or may not apply) a configuration of the Target Cell 604 (e.g., at least one of the one or more configurations associated with the Target Cell 604, the one or more measurement configurations, the measurement object addition, the channel state reporting configuration, the random access resource information, etc.) and/or the UE 602 may not initiate a handover to the Target Cell 604 in response to the RRC message. The UE 602 may perform cell and/or beam measurement associated with the Target Cell 604 and the UE 602 may perform measurement reporting 610 to the Source Cell 606. For example, the UE 602 may transmit a measurement report (e.g., a L1/L3 measurement report, such as a Layer-1 and/or Layer-3 measurement report) to the Source Cell 606. Alternatively and/or additionally, the UE 602 may perform reporting (e.g., Layer-1 reporting), regarding beam quality of the Target Cell 604, to the Source Cell 606. For example, the UE 602 may transmit a measurement report, associated with beam quality of the Target Cell 604, to the Source Cell 606. The Source Cell 606 may determine, based on one or more measurement reports (e.g., a Layer-1 and/or Layer-3 measurement report and/or a measurement report associated with beam quality of the Target Cell 604) transmitted by the UE 602, whether or not to initiate a mobility procedure for the UE 602 to switch connection to the Target Cell 604. The Source Cell 606 may transmit 612 a message to the Target Cell 604, wherein the message comprises information of the UE 602 (e.g., the information may comprise a C-RNTI for the UE 602, reference signal information, a measurement report and/or one or more random access resources) for a mobility procedure (e.g., a possible mobility procedure). The Target Cell 604 may transmit 614 an acknowledgement to the Source Cell 606. In some examples, the acknowledgement may comprise one or more resources, for random access procedure, dedicated to the UE 602 (e.g., a SSB index, a CSI-RS index, one or more RACH occasions and/or a preamble). The Source Cell 606 may trigger and/or initiate 616 a mobility procedure (e.g., a Layer-1 and/or Layer-2 mobility procedure, such as a Layer-1 and/or Layer-2 handover). The Source Cell 606 may trigger and/or initiate 616 the mobility procedure by transmitting a signaling to the UE 602. The signaling may comprise a DCI. Alternatively and/or additionally, the signaling may comprise a MAC CE. The signaling may comprise information for random access procedure of the Target Cell 604 (e.g., at least one of a preamble index, one or more reference signal indexes, one or more RACH occasions). The signaling may be indicative of a cell identity of the Target Cell 604 (e.g., a physical cell identity and/or a serving cell index). In some examples, the information may not comprise a cell configuration (e.g., a cell RRC configuration) of the Target Cell 604. The signaling may not carry information that is indicated by the RRC message (transmitted at 608). At 618, the UE 602 performs a random access procedure on the Target Cell 604 in response to receiving the signaling. Alternatively and/or additionally, the UE 602 may perform the random access procedure on the Target Cell 604 in order to transmit one or more messages to the Target Cell 604. The random access procedure may be a contention-free random access procedure. In response to completion of the random access procedure, the UE 602 may transmit 620 a mobility completion message to the Target Cell 604. Alternatively and/or additionally, the UE 602 may transmit the mobility completion message (or a portion of the mobility completion message) to the Target Cell 604 during the random access procedure. The mobility completion message may comprise a C-RNTI MAC CE, a PUCCH transmission and/or a RRC message. Alternatively and/or additionally, the mobility completion message may not comprise a RRC message. The C-RNTI may be provided by the Source Cell 606 (e.g., the C-RNTI may be included in the RRC message transmitted at 608 and/or in the signaling transmitted to trigger and/or initiate 616 the mobility procedure). The Target Cell 604 may transmit 622 an acknowledgement to the UE 602 (e.g., the acknowledgement may be a positive acknowledgement indicative of successful reception of the mobility completion message). The UE 602 may consider the mobility procedure (and/or the Layer-1 handover or the Layer-2 handover) to be complete based on (and/or in response to) completion of the random access procedure. Alternatively and/or additionally, the UE 602 may consider the mobility procedure (and/or the Layer-1 handover or the Layer-2 handover) to be complete based on (and/or in response to) reception of the acknowledgement. Alternatively and/or additionally, the UE 602 may consider the mobility procedure (and/or the Layer-1 handover or the Layer-2 handover) to be complete based on (and/or in response to) transmission of the mobility completion message.

Figure 7:
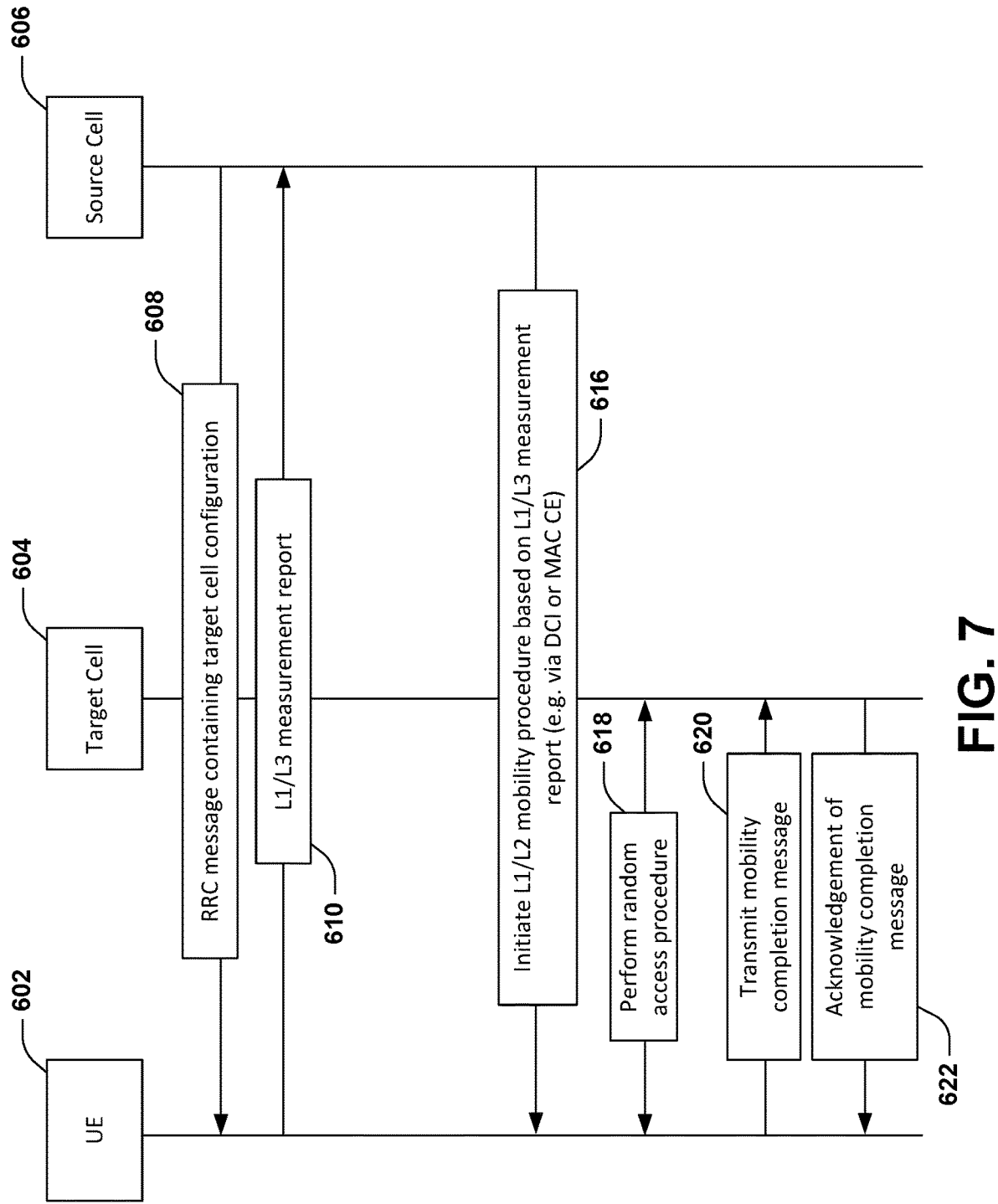
FIG. 7 is a diagram illustrating an exemplary scenario associated with a UE performing a mobility procedure according to one exemplary embodiment.

In some examples, such as shown in FIG. 7, the Source Cell 606 may not transmit 612 the message to the Target Cell 604, and the Target Cell 604 may not transmit 614 the acknowledgement to the Source Cell 606. For example, the Target Cell 604 may not schedule and/or provide dedicated random access resources for the UE 602. The UE 602 may perform a random access procedure (e.g., a contention-based random access procedure) on the Target Cell 604 using one or more resources provided by the Source Cell 606 (e.g., the Source Cell 606 may provide the UE 602 with the one or more resources via the RRC message transmitted at 608 and/or via the signaling transmitted to trigger and/or initiate 616 the mobility procedure).

Figure 8:
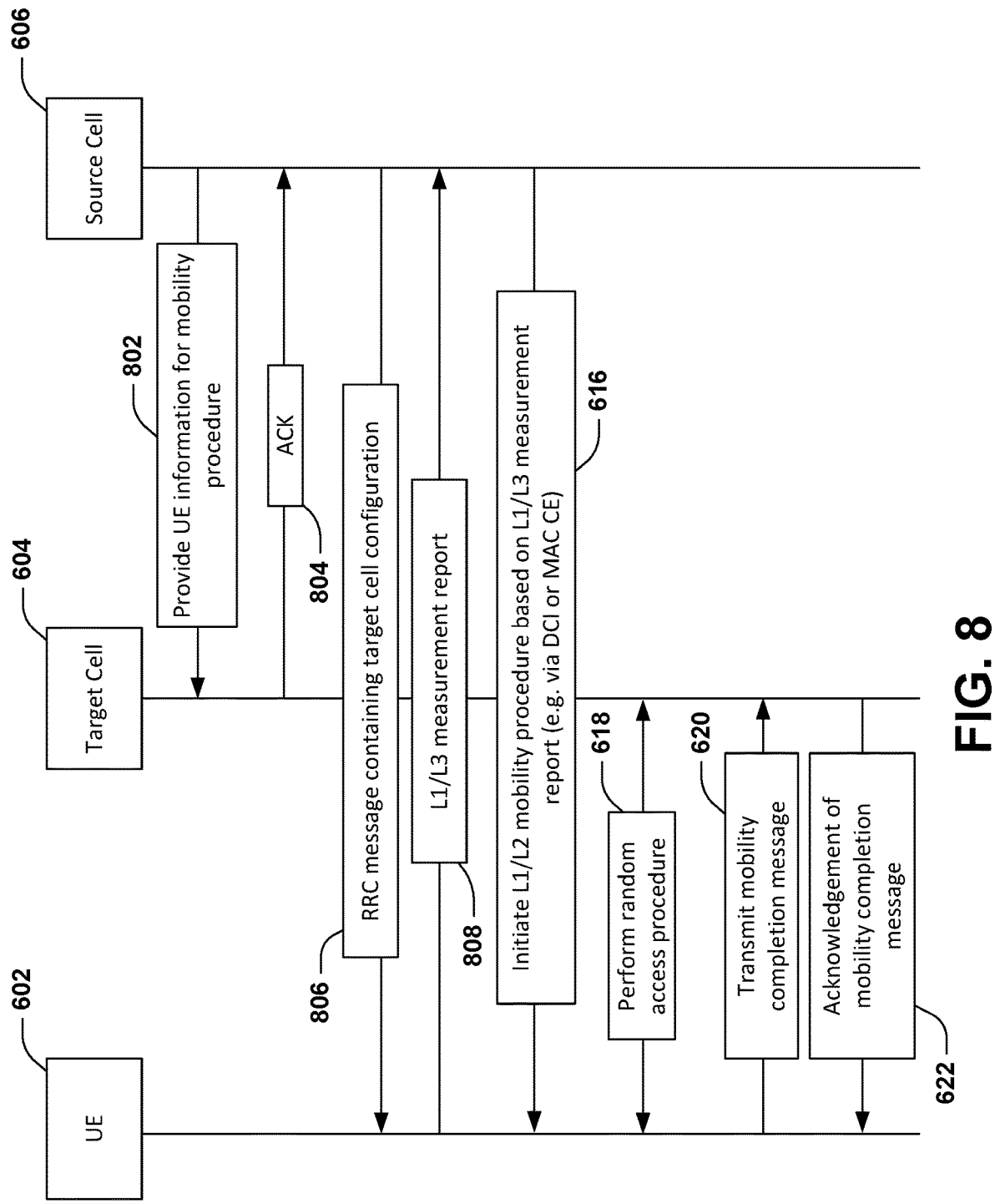
FIG. 8 is a diagram illustrating an exemplary scenario associated with a UE performing a mobility procedure according to one exemplary embodiment.

In some examples, such as shown in FIG. 8, the Source Cell 606 may transmit 802 a message associated with UE information to the Target Cell 604 for mobility procedure (e.g., possible mobility procedure) before receiving a measurement report from the UE 602 and/or before transmitting a RRC message to the UE 602. The Target Cell 604 may transmit 804 an acknowledgement to the Source Cell 606 (e.g., the acknowledgement may indicate successful reception of the message transmitted at 802). The Target Cell 604 may provide one or more random access resources and/or a Target Cell configuration (for the UE 602, for example) to the Source Cell 606 via the acknowledgement transmitted at 804 (e.g., the acknowledgement may be indicative of the one or more random access resources and/or the Target Cell configuration). Alternatively and/or additionally, the Target Cell 604 may provide a set of candidate resources for random access procedure to the Source Cell 606 via the acknowledgement transmitted at 804 (e.g., the acknowledgement may be indicative of the set of candidate resources). The Source Cell 606 may select one or more resources (e.g., one or more suitable resources) from the set of the candidate resources and provide the one or more resources to the UE 602. For example, the Source Cell 606 may provide the one or more resources to the UE 602 via the signaling transmitted to trigger and/or initiate 616 the mobility procedure (e.g., the signaling may be indicative of the one or more resources). In some examples, prior to initiating 616 the mobility procedure, the Source Cell 606 may transmit 806 a RRC message comprising one or more configurations associated with the Target Cell 604 and/or the UE 602 may perform measurement reporting 808 to the Source Cell 606.

A second concept of the present disclosure is that upon (and/or in response to) completion of a mobility procedure to a target cell, a UE may perform one or more procedures. Alternatively and/or additionally, the UE may perform the one or more procedures upon (and/or in response to) receiving second information (e.g., information that comprises and/or is similar to at least some of the second information discussed above with respect to the first concept) associated with the mobility procedure. Alternatively and/or additionally, the UE may perform the one or more procedures upon (and/or in response to) initiation of the mobility procedure. The mobility procedure may be initiated and/or indicated by a source cell. The mobility procedure may comprise the source cell transmitting first information (e.g., information that comprises and/or is similar to at least some of the first information discussed above with respect to the first concept) and the second information to the UE. The first information and the second information may be transmitted via different signalings and/or at different timings (e.g., the first information may be transmitted via a first signaling and/or at a first timing and/or the second information may be transmitted via a second signaling and/or at a second timing, wherein the first signaling is different than the second signaling and/or the first timing is different than the second timing). In some examples, the second information may not be (and/or may not comprise and/or may not be transmitted to the UE via) a RRC message. The first information may comprise one or more configurations of one or more cells comprising the target cell. The second information may indicate, to the UE, an identity and/or index associated with the target cell (and/or the second information may be indicative of other information in addition to the identity and/or the index).

In some examples, a procedure of the one or more procedures may comprise the UE resetting a MAC entity (associated with the source cell, for example) of the UE. For example, the UE may reset the MAC entity in response to receiving the second information from the source cell. The UE may apply (and/or use) the second information after resetting the MAC entity. The UE may apply (and/or use) the first information (associated with the target cell, for example) after resetting the MAC entity. In some examples, a UE may use a configuration and/or information after the configuration and/or the information is applied by the UE (and/or when the configuration and/or the information is applied by the UE). For example, the UE may use the first information after the first information is applied by the UE (and/or when the first information is applied by the UE). The UE may not reset the MAC entity in response to receiving the first information from the source cell. Alternatively and/or additionally, the UE may reset the MAC entity in response to an initiation of a mobility procedure. Alternatively and/or additionally, the UE may reset the MAC entity in response to completion of the mobility procedure. The MAC entity may be associated with the target cell. The MAC entity may be associated with a Master Cell Group (MCG) of the UE.

In some examples, a procedure of the one or more procedures may comprise the UE considering one or more cells to be in deactivated state. In some examples, the one or more cells may not be indicated by the first information and/or the second information provided by the source cell (e.g., the first information and/or the second information may not identify the one or more cells). The one or more cells may be one or more SCells of the UE (e.g., the one or more SCells may be associated with the source cell). For example, the UE may consider the one or more cells to be in deactivated state in response to receiving the second information.

Alternatively and/or additionally, the UE may not change one or more statuses of the one or more cells (e.g., the UE may not change a status of a cell of the one or more cells to activated state and/or to deactivated state) in response to receiving the second information.

The UE may consider the one or more cells to be in deactivated state if the UE receives a RRC message that does not comprise (and/or does not indicate) the one or more cells. The RRC message may indicate a reconfiguration with sync procedure (e.g., the RRC message may be a RRCreconfiguration message with reconfigurationwithsync). The UE may not consider the one or more cells to be deactivated based on the one or more cells not being indicated and/or included in the second information (e.g., if the one or more cells are not indicated and/or included in the second information, the UE may not consider the one or more cells to be deactivated).

In some examples, a procedure of the one or more procedures may comprise the UE considering a second set of one or more cells to be in activated state and/or deactivated state in response to receiving the second information. The second set of one or more cells may be indicated by the first information and/or second information (e.g., the first information and/or the second information may comprise one or more indications of the second set of one or more cells). The UE may determine whether to consider the second set of one or more cells to be in activated state or to consider the second set of one or more cells to be in deactivated state based on the first information and/or the second information. For example, the UE may consider the second set of one or more cells to be in activated state if the second set of one or more cells is indicated and/or included in the second information. Alternatively and/or additionally, the UE may consider the second set of one or more cells to be in deactivated state if the second set of one or more cells is indicated and/or included in the second information.

The UE may consider the one or more cells and/or the second set of one or more cells to be in activated state and/or deactivated state (and/or the UE may change one or more statuses of the one or more cells and/or one or more statuses of the second set of one or more cells) after resetting the MAC entity. Alternatively and/or additionally, the UE may reset the MAC entity after considering the one or more cells to be in activated state and/or deactivated state (and/or the UE may reset the MAC entity after changing the one or more statuses of the one or more cells and/or the one or more statuses of the second set of one or more cells).

In some examples, a procedure of the one or more procedures may comprise the UE configuring one or more lower layers with a configuration associated with the target cell. The configuration may be indicated by the first information. The configuration may comprise a serving cell configuration associated with the target Cell. The UE may not configure the one or more lower layers with the configuration in response to reception of the first information. For example, the UE may configure the one or more lower layers with the configuration in response to reception of the second information. Alternatively and/or additionally, the UE may configure the one or more lower layers with the configuration in response to completion of the mobility procedure. The configuration may not be included and/or provided in the second information. The configuration may comprise ServingCellConfigCommon (and/or information indicated as ServingCellConfigCommon). The UE may configure the one or more lower layers with the configuration after resetting the MAC entity. Alternatively and/or additionally, the UE may configure the one or more lower layers with a part of the configuration (e.g., the first information is indicative of the part of the configuration) in response to reception of the first information. Alternatively and/or additionally, the UE may configure the one or more lower layers with the part of the configuration in response to reception of the second information.

In some examples, the UE may apply (and/or use) a downlink configuration and/or an uplink configuration associated with the target cell in response to reception of the first information. Alternatively and/or additionally, the UE may apply (and/or use) beam information and/or Transmission Configuration Indicator (TCI) state information associated with the target cell in response to reception of the first information. Alternatively and/or additionally, the UE may apply (and/or use) a Channel State Information (CSI) reporting configuration associated with the target cell in response to reception of the first information.

In some examples, the UE may apply (and/or use) a downlink configuration and/or an uplink configuration associated with the target cell in response to reception of the second information. Alternatively and/or additionally, the UE may apply (and/or use) beam information and/or TCI state information associated with the target cell in response to reception of the second information.

In some examples, the UE may apply (and/or use) a CSI reporting configuration, a scheduling request configuration and/or a sounding Reference Signal (RS) configuration (associated with the target cell, for example) in response to receiving the second information.

In some examples, the UE may apply (and/or use) a measurement and/or radio resource configuration associated with the target cell in response to receiving the second information. The measurement and/or radio resource configuration may require the UE to know a System Frame Number (SFN) of the target cell (and/or the UE may be required to know the SFN of the target cell in order to apply and/or use the measurement and/or radio resource configuration). The UE may not apply (and/or use) the measurement and/or radio resource configuration in response to receiving a RRC signaling (wherein the RRC signaling is associated with initiation of a reconfiguration with sync and/or handover procedure, for example).

The measurement and/or radio resource configuration may comprise one or more measurement gaps, periodic Channel Quality Indicator (CQI) reporting, a scheduling request configuration and/or a sounding RS configuration.

The one or more lower layers may comprise physical layer, MAC layer, RLC layer, PDCP layer and/or Service Data Adaptation Protocol (SDAP) layer of the UE.

In some examples, a procedure of the one or more procedures may comprise the UE considering the target cell to be a PCell or a Primary Secondary Cell (PSCell). For example, the UE may consider the target cell to be a PCell or a PSCell in response to receiving the second information. Alternatively and/or additionally, the UE may consider the target cell to be a PCell or a PSCell in response to completion of the mobility procedure. The UE may monitor PDCCH associated with the target cell upon (and/or in response to) considering the target cell to be a PCell or a PSCell (and/or the UE may monitor PDCCH associated with the target cell when the UE considers the target cell to be a PCell or a PSCell). Alternatively and/or additionally, the UE may apply (and/or use) RNTI associated with the target cell (e.g., C-RNTI) in response to receiving the second information. Alternatively and/or additionally, the UE may activate the target cell in response to considering the target cell to be a PCell or a PSCell.

Alternatively and/or additionally, the UE may not consider the target cell to be a PCell in response to receiving the second information. For example, the UE may not consider the target cell to be a PCell or a PSCell until completion of the mobility procedure (e.g., the UE may consider the target cell to be a PCell or a PSCell upon and/or in response to completion of the mobility procedure). The UE may monitor the target cell (e.g., monitor PDCCH addressed to a RA-RNTI associated with a random access procedure and/or monitor PDCCH from the target cell) during the mobility procedure (e.g., the UE may monitor the target cell during the mobility procedure even during times in which the UE does not consider the target cell to be a PCell or a PSCell).

In some examples, the UE may apply a RNTI value (e.g., a RNTI value for a target cell) upon (and/or in response to) initiating a mobility procedure on a target cell. The mobility procedure may comprise a source cell transmitting a first information and a second information to the UE. The RNTI value may be provided by the source cell via the first information and/or the second information (e.g., the first information and/or the second information may be indicative of the RNTI value). Alternatively and/or additionally, the UE may apply the RNTI value upon (and/or in response to) completion of the mobility procedure (and/or the UE may apply the RNTI value when the mobility procedure is completed). The source cell may trigger and/or initiate the mobility procedure via transmitting the second information to the UE. The UE may initiate the mobility procedure on the target cell in response to receiving the second information. In some examples, the UE does not apply the RNTI value in response to (and/or when) receiving the first information.

Alternatively and/or additionally, the RNTI value for the target cell may not be provided by the source cell (via the first information and/or the second information, for example). Alternatively and/or additionally, the first information and/or the second information may not be indicative of the RNTI value for the target cell. In some examples, the UE may consider a second RNTI associated with the source cell to be the RNTI value for the target cell. For example, the UE may reuse the second RNTI (that is used for communication with the source cell, for example) as the RNTI value for the target cell. Alternatively and/or additionally, the UE may reuse a previous RNTI associated with the target cell (e.g., a RNTI that the UE previously used for communication with the target cell) for performing the mobility procedure. For example, the previous RNTI may be a RNTI used (by the UE, for example) for the target cell before initiation of the mobility procedure.

Alternatively and/or additionally, the UE may determine whether or not to initiate a random access procedure (e.g., a contention-based random access procedure) on the target cell (during the mobility procedure, for example) based on whether or not a RNTI value for the target cell is provided by the source cell (such as based on whether or not the first information and/or the second information indicate a RNTI value for the target cell). The UE may initiate a random access procedure (e.g., a contention-based random access procedure) on the target cell (during the mobility procedure, for example) if a RNTI value for the target cell is not provided by the source cell.

The UE may discard a RNTI associated with the source cell upon (and/or in response to) the mobility procedure (e.g., the UE may discard the RNTI associated with the source cell in response to initiation or completion of the mobility procedure).

A third concept of the present disclosure is that a source cell (and/or a target cell) may determine whether or not to provide a configuration and/or information, for a mobility procedure to the target cell, to a UE via a first information and/or via a second information based on a type of the target cell (and/or based on other information in addition to the type of the target cell).

In some examples, the source cell (and/or the target cell) may provide the configuration (and/or the information) to the UE if the target cell is a non-serving cell (e.g., if the target cell is not a serving cell of the UE). The source cell (and/or the target cell) may not provide the configuration (and/or the information) to the UE if the target cell is a SCell.

The configuration (and/or the information) may be provided via the first information and/or the second information. For example, the first information and/or the second information may be indicative of the configuration (and/or the information).

The configuration (and/or the information) may comprise sCellConfigCommon, CellGroupConfig and/or ReconfigurationWithSync. Alternatively and/or additionally, the configuration (and/or the information) may comprise information indicated in sCellConfigCommon, CellGroupConfig and/or ReconfigurationWithSync.

In some examples, the source cell (and/or the target cell) may provide newUE-Identity and/or a RNTI value to the UE for the target cell via the first information and/or the second information if the target cell is a non-serving cell. In some examples, the source cell (and/or the target cell) may not provide the RNTI value to the UE if the target cell is a SCell. In another example, the source cell (and/or the target cell) may provide a physical cell identity to the UE if the target cell is a non-serving cell. In some examples, the source cell (and/or the target cell) may not provide a physical cell identity to the UE if the target cell is a SCell.

A fourth concept of the present disclosure is that a UE may determine, based on a type of a target cell (and/or based on other information in addition to the type of the target cell), whether or not to apply a configuration associated with the target cell in response to (and/or upon and/or when) a mobility procedure (e.g., in response to and/or upon initiation of the mobility procedure or in response to and/or upon completion of the mobility procedure).

In some examples, the UE may apply the configuration associated with the target cell in response to initiation (or completion) of the mobility procedure if the target cell is a non-serving cell. In some examples, the UE may not apply the configuration associated with the target cell in response to initiation (or completion) of the mobility procedure if the target cell is a SCell (of a cell group (CG) of the source cell). The UE may use, reuse, and/or keep using a previous configuration associated with the target cell during and/or after the mobility procedure if the target cell is a SCell. The previous configuration may not be provided by the first information and/or the second information. The previous configuration may be provided (to the UE, for example) before initiation of the mobility procedure.

Alternatively and/or additionally, the UE may determine whether or not to reuse the previous configuration based on whether or not a new configuration is provided in the first information and/or the second information from the source cell. If a new configuration (associated with the target cell, for example) is not provided in the first information and/or the second information (and/or if no new configuration is provided in the first information and/or the second information), the UE may initiate a mobility procedure to the target cell using the previous configuration. If a new configuration is provided in the first information and/or the second information, the UE may apply the new configuration to the target cell and/or the UE may initiate a mobility procedure to the target cell using the new configuration.

In an example, the UE is configured with a SCell by a network via a first information. The first information may comprise a configuration (e.g., an uplink and/or downlink configuration) of the SCell. The UE is indicated (and/or instructed) by the network to perform a mobility procedure to the SCell. For example, the network may indicate to (and/or instruct) the UE to perform the mobility procedure to the SCell via a second information. The second information may be transmitted to the UE after the UE is configured with the SCell via the first information. In some examples, the second information does not comprise the configuration of the SCell. The UE may perform the mobility procedure using the configuration in the first information.

In another example, the UE is configured with a SCell by a network via a first information. The first information may comprise a configuration (e.g., an uplink and/or downlink configuration) of the SCell. The UE is indicated (and/or instructed) by the network to perform a mobility procedure to the SCell via a second information. For example, the network may indicate to (and/or instruct) the UE to perform the mobility procedure to the SCell via a second information. The second information may be transmitted to the UE after the UE is configured with the SCell via the first information. The second information may comprise an uplink and/or downlink configuration of the SCell. The UE performs the mobility procedure using the configuration (e.g., the uplink and/or downlink configuration) in the second information.

With respect to one or more embodiments herein, such as one or more techniques, devices, concepts, methods and/or alternatives described above, a mobility procedure (e.g., a Layer-1 and/or Layer-2 mobility procedure) may comprise a source cell providing first information to a UE, wherein the first information indicates and/or provides a configuration associated with a target cell. The configuration may comprise cell addition information and/or beam information associated with the target cell. The first information may be a dedicated signaling to the UE. The source cell may provide second information to the UE, wherein the second information indicates initiation of a mobility procedure to the target cell. The mobility procedure may comprise a random access procedure, one or more PUSCH transmissions and/or beam activation (e.g., beam TCI state activation). In some examples, the second information may not comprise a RRC signaling and/or a RRC message (and/or the second information may not be provided to the UE via a RRC signaling and/or a RRC message). The second information may comprise a Layer-1 (L1) message (e.g., a Downlink control information message, such as a L1 Downlink control information message) or a Layer-2 (L2) message (e.g., a MAC CE message, such as a L2 MAC CE message). The first information and the second information may be transmitted via different signalings and/or at different timings (e.g., the first information may be transmitted via a first signaling and/or at a first timing and/or the second information may be transmitted via a second signaling and/or at a second timing, wherein the first signaling is different than the second signaling and/or the first timing is different than the second timing). The UE may not initiate the mobility procedure to the target cell in response to the first information (e.g., the UE may not initiate the mobility procedure to the target cell in response to reception of the first information). The UE may transmit a mobility completion message to the target cell, wherein the mobility completion message indicates completion of the mobility procedure. Alternatively and/or additionally, the target cell may transmit an acknowledgement to the UE, wherein the acknowledgement is indicates completion of the mobility procedure. An example is shown in FIG. 9. The Source Cell (shown with reference number 906) may transmit 908 the first information (comprising a target cell configuration and/or a target cell pre-configuration, for example) to the UE (shown with reference number 902). The Source Cell 906 may transmit 910 the second information (indicating initiation of the mobility procedure, for example) to the UE. The UE 902 may transmit 912 the mobility completion message to the Target Cell (shown with reference number 904). The Target Cell 904 may transmit the acknowledgement to the UE 902 (e.g., the acknowledgement may indicate that the mobility completion message is successfully received by the Target Cell 904). The UE 902 may consider 916 the mobility procedure to be complete in response to the acknowledgement from the Target Cell 904. Alternatively and/or additionally, the UE may consider 916 the mobility procedure to be complete in response to the transmission 912 of the mobility completion message. Alternatively and/or additionally, the UE 902 may consider the mobility procedure to be complete in response to completion of a random access procedure (e.g., a random access procedure associated with the mobility procedure, such as a random access procedure performed on the target cell 904 during the mobility procedure).

With respect to one or more embodiments herein, the mobility procedure may comprise a handover procedure (and/or a part of a handover procedure) and/or a reconfiguration with sync procedure (and/or a part of a reconfiguration with sync procedure).

With respect to one or more embodiments herein, completion of a mobility procedure may correspond to (and/or may be) completion of a random access procedure associated with the mobility procedure (e.g., the mobility procedure may be completed when the random access procedure is completed). Alternatively and/or additionally, the completion of the mobility procedure may correspond to (and/or may be) a transmission of a mobility completion message (to the target cell, for example) (e.g., the mobility procedure may be completed when the mobility completion message is transmitted). Alternatively and/or additionally, the completion of the mobility procedure may correspond to (and/or may be) a reception of an acknowledgement of the mobility completion message (from the target cell, for example) (e.g., the mobility procedure may be completed when the acknowledgement is received).

With respect to one or more embodiments herein, the mobility procedure may not be a reconfiguration with sync (e.g., the mobility procedure may not be a Layer-3 handover).

With respect to one or more embodiments herein, the first information may be (and/or may be transmitted in) a RRC message (e.g., a RRCReconfiguration message).

With respect to one or more embodiments herein, the first information may comprise an uplink resource configuration and/or a downlink resource configuration associated with the target cell.

With respect to one or more embodiments herein, the second information may not be a RRC message and/or a RRC signaling. The second information may comprise (and/or may be transmitted in) a PDCCH signaling (e.g., DCI) and/or a MAC CE.

With respect to one or more embodiments herein, the handover procedure (e.g., the Layer-1 and/or Layer-2 handover procedure) may be a mobility procedure. The handover procedure may not be a reconfiguration with sync procedure. The mobility procedure may be a procedure for L1/L2-centric inter-cell mobility (e.g., Layer-1-centric inter-cell mobility and/or Layer-2-centric inter-cell mobility).

With respect to one or more embodiments herein, the mobility procedure may comprise the UE transmitting, to the target cell, uplink data and/or control information. The uplink data may comprise information associated with the UE (e.g., the information may comprise a C-RNTI MAC CE). The uplink data may be transmitted via PUSCH. The uplink control information may be transmitted via PUCCH.

With respect to one or more embodiments herein, the message (e.g., the message may indicate completion of the mobility procedure and/or a random access procedure may be initiated in response to the message becoming available for transmission) may be a mobility completion message. In some examples, the mobility completion message may not comprise (and/or may not be transmitted in) a RRC message. The mobility completion message may comprise a MAC CE. The mobility completion message may be transmitted via a PUCCH transmission or a PUSCH transmission.

With respect to one or more embodiments herein, the first cell may be a serving cell of the UE.

With respect to one or more embodiments herein, the first cell may be a PCell of the UE.

With respect to one or more embodiments herein, the first cell may be a SCell of the UE.

With respect to one or more embodiments herein, the first cell and the second cell may be in different cell groups (CGs).

With respect to one or more embodiments herein, the first cell may be a source cell of the UE during a mobility procedure.

With respect to one or more embodiments herein, the second cell may be a neighboring cell (e.g., a neighboring cell of the UE and/or a neighboring cell that is not a serving cell of the UE).

With respect to one or more embodiments herein, the second cell may be a serving cell. Alternatively and/or additionally, the second cell may be a deactivated cell or an activated cell.

With respect to one or more embodiments herein, the UE may consider the second cell to be a target cell in response to receiving the second information indicating the second cell.

With respect to one or more embodiments herein, the UE may activate the second cell in response to receiving the second information if the second cell is a deactivated cell.

With respect to one or more embodiments herein, the source cell may be a serving cell.

With respect to one or more embodiments herein, the source cell may be a PCell of the UE.

With respect to one or more embodiments herein, the source cell may be a SCell of the UE.

With respect to one or more embodiments herein, the source cell and the second cell may be in different cell groups (CGs).

With respect to one or more embodiments herein, the source cell may be a source cell of the UE during a mobility procedure.

With respect to one or more embodiments herein, the target cell may be a neighboring cell.

With respect to one or more embodiments herein, the target cell may be a serving cell. Alternatively and/or additionally, the target cell may be a deactivated cell or an activated cell.

With respect to one or more embodiments herein, the first information and the second information may be transmitted in dedicated signalings (e.g., the first information may be transmitted via a first dedicated signaling that is directed and/or transmitted only to the UE and/or the second information may be transmitted via a second dedicated signaling that is directed and/or transmitted only to the UE).

With respect to one or more embodiments herein, the configuration may comprise a downlink configuration or an uplink configuration associated with the target cell. For example, the configuration may be (and/or may comprise) ServingCellConfig or ServingCellConfigCommon. Alternatively and/or additionally, the configuration may be (and/or may comprise) one, some and/or all parameters of ServingCellConfig or one, some and/or all parameters of ServingCellConfigCommon.

Alternatively and/or additionally, the configuration may comprise a timing alignment configuration (and/or timing alignment information) associated with the target cell. Alternatively and/or additionally, the configuration may comprise a TCI state and/or beam configuration (and/or TCI state and/or beam information) associated with the target cell.

One, some and/or all of the foregoing techniques and/or embodiments can be formed to a new embodiment.

In some examples, embodiments disclosed herein, such as embodiments described with respect to the first concept, the second concept, the third concept and the fourth concept, may be implemented independently and/or separately. Alternatively and/or additionally, a combination of embodiments described herein, such as embodiments described with respect to the first concept, the second concept, the third concept and/or the fourth concept, may be implemented. Alternatively and/or additionally, a combination of embodiments described herein, such as embodiments described with respect to the first concept, the second concept, the third concept and/or the fourth concept, may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

Figure 10:
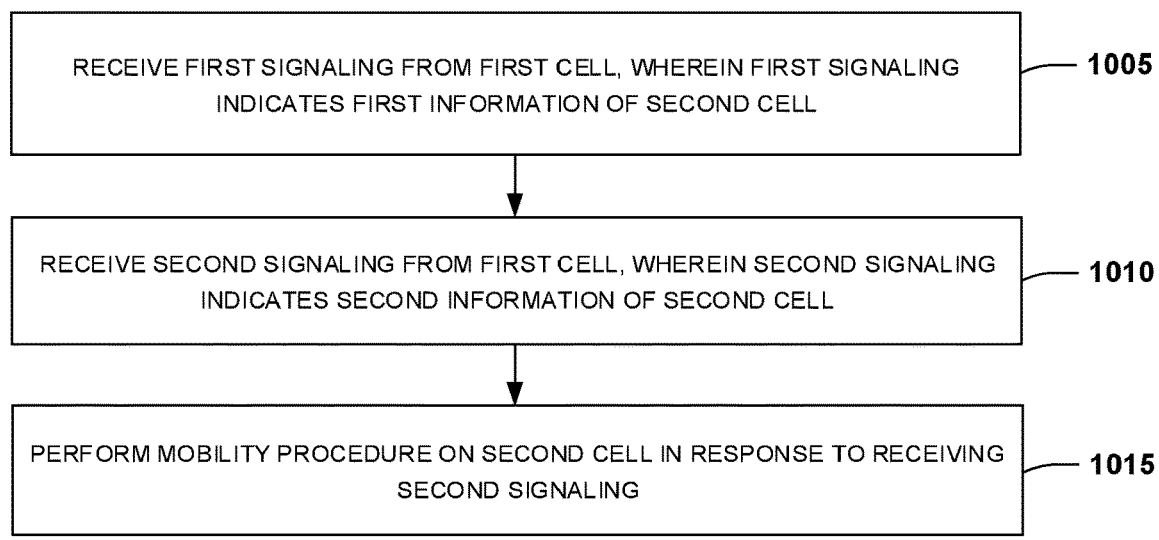
FIG. 10 is a flow chart according to one exemplary embodiment.

FIG. 10 is a flow chart 1000 according to one exemplary embodiment from the perspective of a UE. In step 1005, the UE receives a first signaling from a first cell, wherein the first signaling indicates first information of a second cell. In step 1010, the UE receives a second signaling from the first cell, wherein the second signaling indicates second information of the second cell. In step 1015, the UE performs a mobility procedure on the second cell in response to receiving the second signaling.

Referring back to FIGS. 3 and 4, in one exemplary embodiment of a UE, the device 300 includes a program code 312 stored in the memory 310. The CPU 308 may execute program code 312 to enable the UE (i) to receive a first signaling from a first cell, wherein the first signaling indicates first information of a second cell, (ii) to receive a second signaling from the first cell, wherein the second signaling indicates second information of the second cell, and (iii) to perform a mobility procedure on the second cell in response to receiving the second signaling. Furthermore, the CPU 308 can execute the program code 312 to perform one, some and/or all of the above-described actions and steps and/or others described herein.

Figure 11:
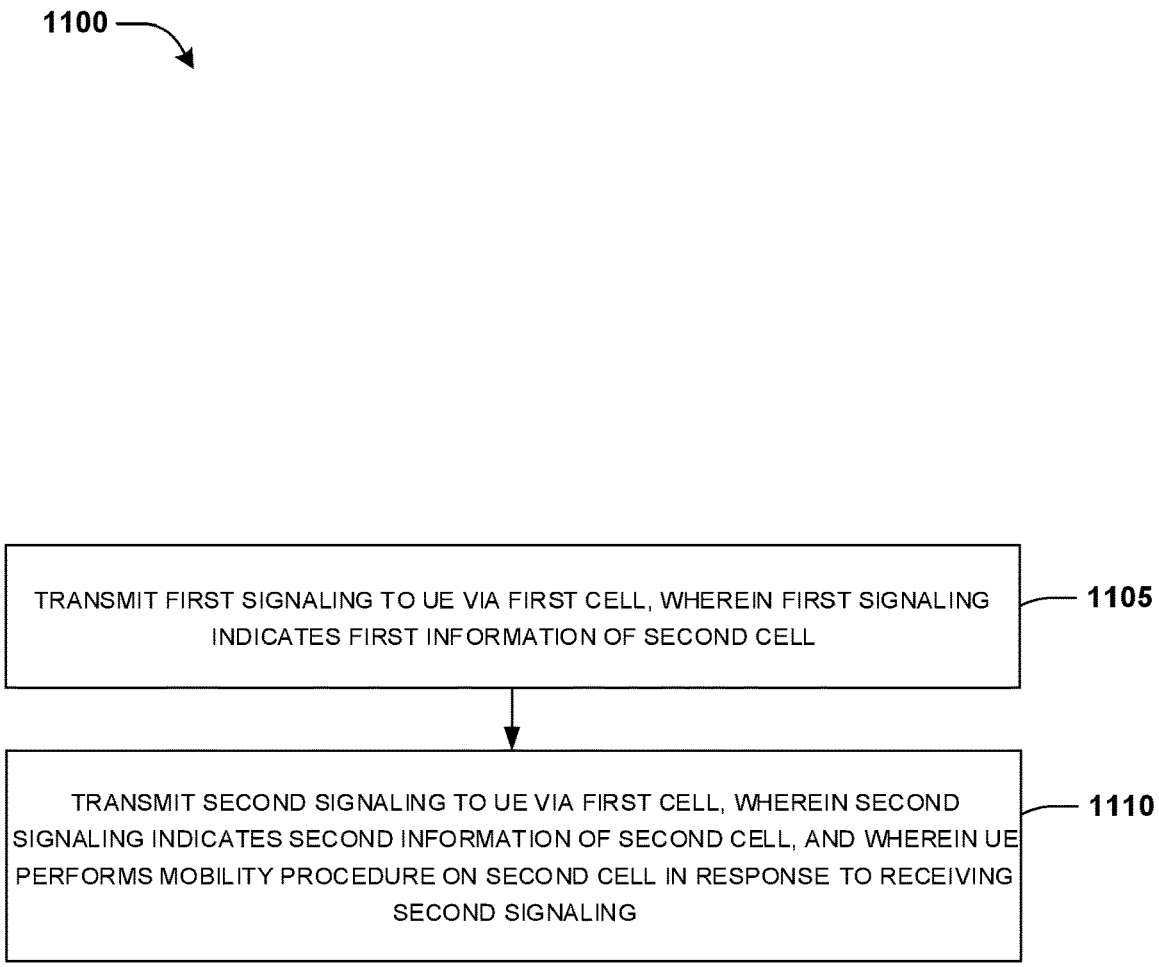
FIG. 11 is a flow chart according to one exemplary embodiment.

FIG. 11 is a flow chart 1100 according to one exemplary embodiment from the perspective of a network. In step 1105, the network transmits a first signaling to a UE via a first cell, wherein the first signaling indicates first information of a second cell. In step 1110, the network transmits a second signaling to the UE via the first cell, wherein the second signaling indicates second information of the second cell, and wherein the UE performs a mobility procedure on the second cell in response to receiving the second signaling.

Referring back to FIGS. 3 and 4, in one exemplary embodiment of a network, the device 300 includes a program code 312 stored in the memory 310. The CPU 308 may execute program code 312 to enable the network (i) to transmit a first signaling to a UE via a first cell, wherein the first signaling indicates first information of a second cell, and (ii) to transmit a second signaling to the UE via the first cell, wherein the second signaling indicates second information of the second cell, and wherein the UE performs a mobility procedure on the second cell in response to receiving the second signaling. Furthermore, the CPU 308 can execute the program code 312 to perform one, some and/or all of the above-described actions and steps and/or others described herein.

With respect to FIGS. 10-11, in one embodiment, the network initiates and/or triggers the mobility procedure of the UE by transmitting the second signaling.

In one embodiment, the UE does not perform a handover procedure nor a mobility procedure on the second cell in response to receiving the first signaling.

In one embodiment, the mobility procedure comprises the UE initiating a random access procedure on the second cell.

In one embodiment, the mobility procedure comprises the UE triggering and/or generating a third signaling (e.g., the UE may trigger and/or generate the third signaling for transmission to the second cell).

In one embodiment, the mobility procedure comprises the UE transmitting the third signaling to the second cell.

In one embodiment, the mobility procedure comprises the UE considering the second cell to be a SpCell (e.g., a SpCell of the UE).

In one embodiment, the mobility procedure comprises the network transmitting an acknowledgement (e.g., a positive acknowledgement) to the UE in response to receiving (e.g., successfully receiving) the third signaling.

In one embodiment, the UE considers the mobility procedure to be completed in response to completion of the random access procedure.

In one embodiment, the UE considers the mobility procedure to be completed in response to reception of the acknowledgement.

In one embodiment, the UE considers the second cell to be a PCell in response to completion of the mobility procedure and/or in response to completion of the random access procedure.

In one embodiment, the first signaling is a RRC message.

In one embodiment, the first signaling indicates an identity of the second cell (e.g., the first signal may be indicative of a serving cell index of the second cell and/or a physical cell identity of the second cell).

In one embodiment, the first signaling comprises one or more uplink configurations of the second cell.

In one embodiment, the first signaling comprises one or more downlink configurations of the second cell.

In one embodiment, the first signaling comprises beam information of the second cell.

In one embodiment, the first signaling comprises one or more cell configurations of the second cell.

In one embodiment, the first signaling comprises one or more random access resources, of the second cell, for the UE.

In one embodiment, the first signaling does not indicate one or more random access resources, to the UE (e.g., dedicated to the UE), that are for handover to the second cell.

In one embodiment, the first signaling indicates one or more random access resources, to the UE (e.g., dedicated to the UE), for beam failure recovery.

In one embodiment, the second signaling is a DCI.

In one embodiment, the second signaling is a MAC CE.

In one embodiment, the second signaling indicates an identity and/or an index of the second cell.

In one embodiment, the second signaling indicates one or more resources for a random access procedure associated with a handover procedure or a mobility procedure on the second cell. For example, one or more resources and/or the random access procedure may be for the handover procedure or for the mobility procedure. Alternatively and/or additionally, the random access procedure may be performed (using the one or more resources, for example) in order to perform the handover procedure or the mobility procedure. Alternatively and/or additionally, the random access procedure may be performed during and/or in association with the handover procedure or the mobility procedure.

In one embodiment, the second signaling does not indicate a cell configuration (e.g., ServingCellConfigCommon and/or information indicated as ServingCellConfigCommon) of the second cell.

In one embodiment, the second signaling comprises a field. The UE may perform the mobility procedure on a cell (e.g., the second cell) indicated by the second signaling if the field is set to a value (e.g., a specific value and/or a configured value with which the UE is configured).

In one embodiment, the second signaling comprises a field. The UE may not perform the mobility procedure on a cell (e.g., the second cell) indicated by the second signaling if the field is not set to a value (e.g., a specific value and/or a configured value with which the UE is configured).

In one embodiment, the UE performs a random access procedure for the mobility procedure on the second cell if the second signaling indicates that the second cell is a neighboring cell (e.g., a neighboring cell of the UE).

In one embodiment, the UE transmits a reporting (e.g., one or more reports) to the first cell, wherein the reporting indicates channel quality associated with the second cell.

In one embodiment, the reporting is (and/or comprises) a cell measurement report.

In one embodiment, the reporting is (and/or comprises) a beam reporting (e.g., the reporting comprises channel state information).

In one embodiment, the network determines whether or not to initiate a mobility procedure on the UE (and/or whether or not to transmit the second signaling to initiate the mobility procedure) based on the reporting from the UE (and/or based on other information in addition to the reporting from the UE).

In one embodiment, the UE performs the random access procedure using one or more resources indicated by the second information.

In one embodiment, the UE performs the random access procedure using one or more resources indicated by the first information.

In one embodiment, the UE performs the random access procedure using one or more resources, that are for beam failure recovery, and that are indicated by the first information.

In one embodiment, the one or more random access resources comprise one or more preambles for the UE.

In one embodiment, the one or more random access resources comprise one or more reference signals.

In one embodiment, the one or more random access resources comprise one or more random access occasions.

In one embodiment, the second cell is a neighboring cell of the UE.

In one embodiment, the second cell is a serving cell of the UE.

In one embodiment, the second cell is an activated serving cell of the UE.

In one embodiment, the second cell is a deactivated serving cell of the UE.

In one embodiment, the third signaling is a PUCCH transmission and/or a PUSCH transmission.

In one embodiment, the third signaling indicates an RNTI value of the UE, wherein the RNTI value is provided by the first cell via the first information and/or via the second information (e.g., the first information and/or the second information may be indicative of the RNTI value).

In one embodiment, the third signaling is a MAC PDU comprising a MAC CE (and/or comprising other information in addition to the MAC CE).

Figure 12:
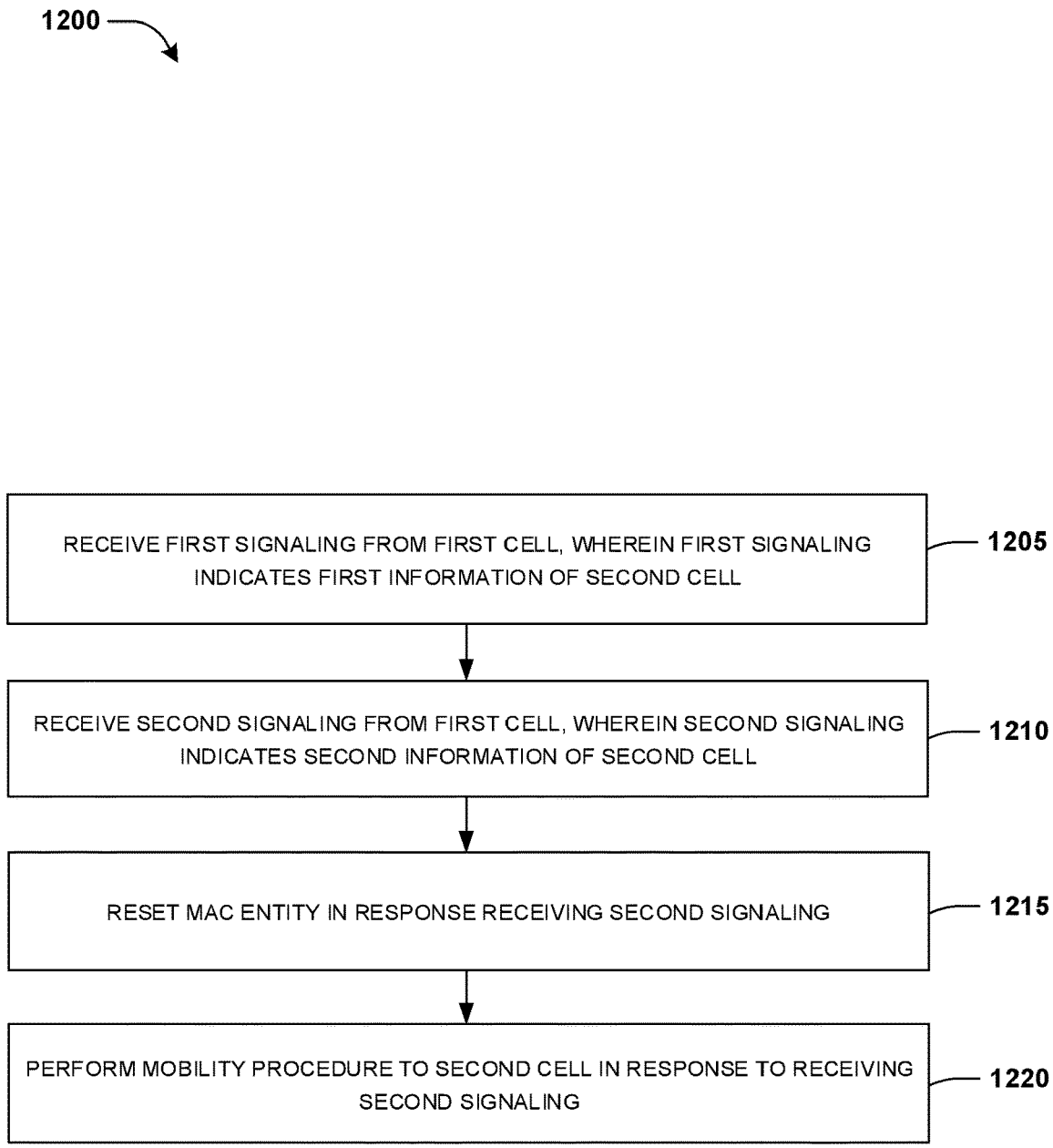
FIG. 12 is a flow chart according to one exemplary embodiment.

FIG. 12 is a flow chart 1200 according to one exemplary embodiment from the perspective of a UE. In step 1205, the UE receives a first signaling from a first cell, wherein the first signaling indicates first information of a second cell. In step 1210, the UE receives a second signaling from the first cell, wherein the second signaling indicates second information of the second cell. In step 1215, the UE resets a MAC entity (e.g., a MAC entity associated with the first cell) in response to receiving the second signaling. In step 1220, the UE performs a mobility procedure to the second cell in response to receiving the second signaling.

Referring back to FIGS. 3 and 4, in one exemplary embodiment of a UE, the device 300 includes a program code 312 stored in the memory 310. The CPU 308 may execute program code 312 to enable the UE (i) to receive a first signaling from a first cell, wherein the first signaling indicates first information of a second cell, (ii) to receive a second signaling from the first cell, wherein the second signaling indicates second information of the second cell, (iii) to reset a MAC entity (e.g., a MAC entity associated with the first cell) in response receiving the second signaling, and (iv) to perform a mobility procedure to the second cell in response to receiving the second signaling. Furthermore, the CPU 308 can execute the program code 312 to perform one, some and/or all of the above-described actions and steps and/or others described herein.

Figure 13:
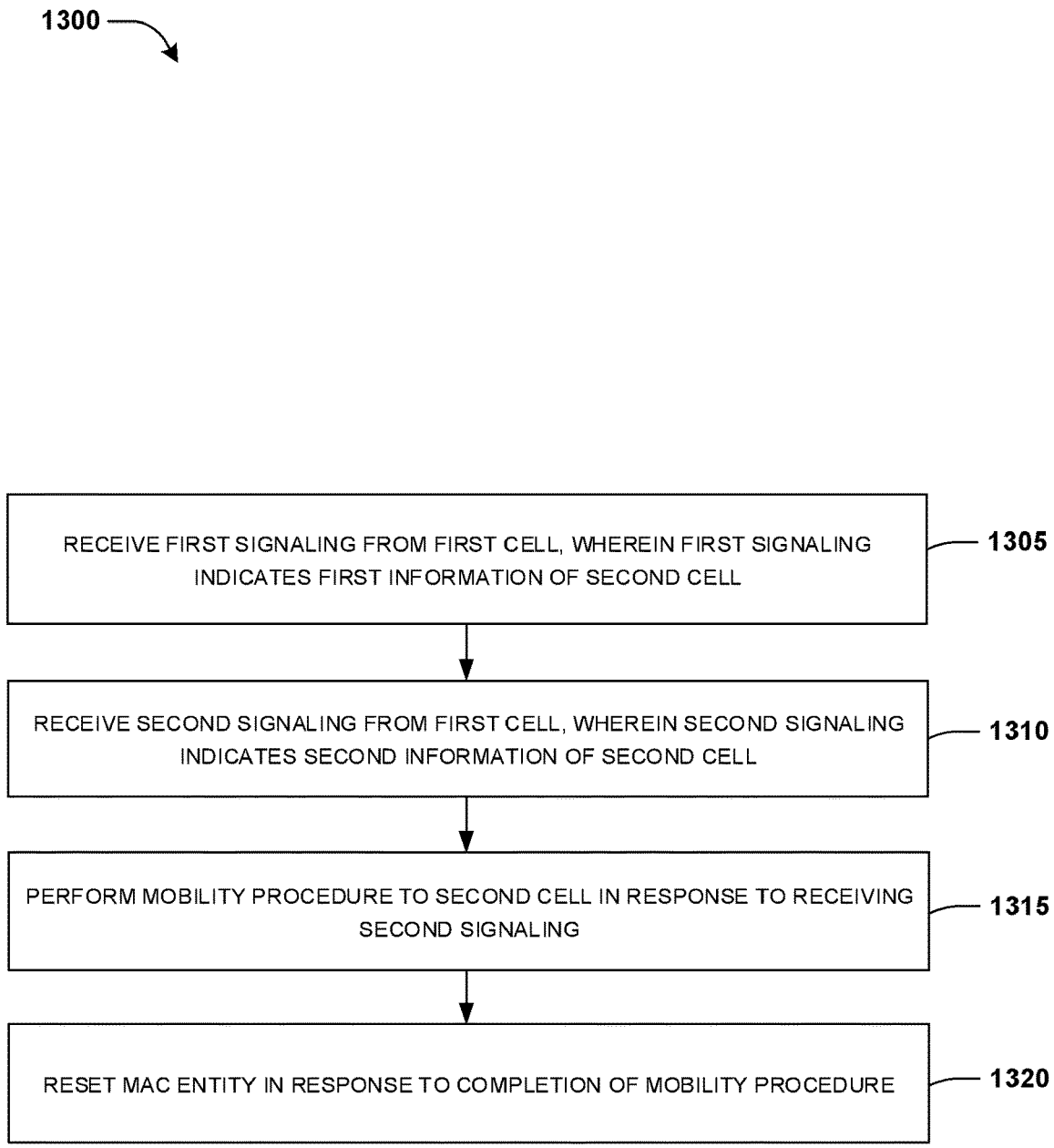
FIG. 13 is a flow chart according to one exemplary embodiment.

FIG. 13 is a flow chart 1300 according to one exemplary embodiment from the perspective of a UE. In step 1305, the UE receives a first signaling from a first cell, wherein the first signaling indicates first information of a second cell. In step 1310, the UE receives a second signaling from the first cell, wherein the second signaling indicates second information of the second cell. In step 1315, the UE performs a mobility procedure to the second cell in response to receiving the second signaling. In step 1320, the UE resets a MAC entity (e.g., a MAC entity associated with the first cell) in response to completion of the mobility procedure.

Referring back to FIGS. 3 and 4, in one exemplary embodiment of a UE, the device 300 includes a program code 312 stored in the memory 310. The CPU 308 may execute program code 312 to enable the UE (i) to receive a first signaling from a first cell, wherein the first signaling indicates first information of a second cell, (ii) to receive a second signaling from the first cell, wherein the second signaling indicates second information of the second cell, (iii) to perform a mobility procedure to the second cell in response to receiving the second signaling, and (iv) to reset a MAC entity (e.g., a MAC entity associated with the first cell) in response to completion of the mobility procedure. Furthermore, the CPU 308 can execute the program code 312 to perform one, some and/or all of the above-described actions and steps and/or others described herein.

With respect to FIGS. 12-13, in one embodiment, the UE considers one or more cells to be deactivated in response to receiving the second signaling, wherein the one or more cells are not indicated by the first information and/or the second information (e.g., the first information and/or the second information are not indicative of the one or more cells).

In one embodiment, the UE considers one or more cells to be deactivated in response to completion of the mobility procedure, wherein the one or more cells are not indicated by the first information and/or the second information (e.g., the first information and/or the second information are not indicative of the one or more cells).

In one embodiment, the UE applies (and/or uses) one or more configurations indicated by the first information in response to receiving the second signaling.

In one embodiment, the UE applies (and/or uses) one or more configurations indicated by the first information in response to completion of the mobility procedure.

Figure 14:
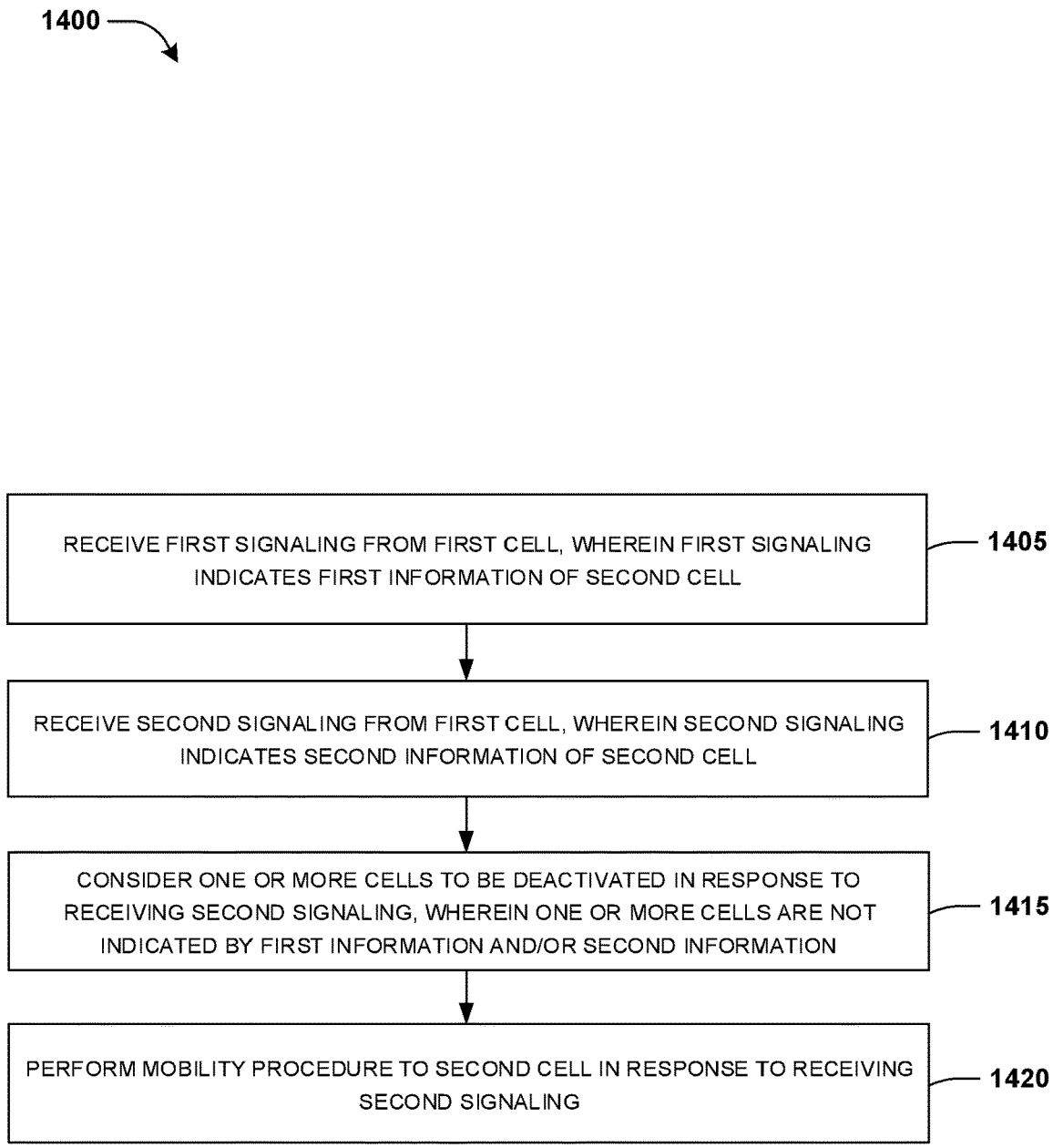
FIG. 14 is a flow chart according to one exemplary embodiment.

FIG. 14 is a flow chart 1400 according to one exemplary embodiment from the perspective of a UE. In step 1405, the UE receives a first signaling from a first cell, wherein the first signaling indicates first information of a second cell. In step 1410, the UE receives a second signaling from the first cell, wherein the second signaling indicates second information of the second cell. In step 1415, the UE considers one or more cells to be deactivated (e.g., to be in deactivated state) in response to receiving the second signaling, wherein the one or more cells are not indicated by the first information and/or the second information (e.g., the first information and/or the second information are not indicative of the one or more cells). For example, the UE may consider the one or more cells to be deactivated based on a determination that the first information and/or the second information are not indicative of the one or more cells. In step 1420, the UE performs a mobility procedure to the second cell in response to receiving the second signaling.

Referring back to FIGS. 3 and 4, in one exemplary embodiment of a UE, the device 300 includes a program code 312 stored in the memory 310. The CPU 308 may execute program code 312 to enable the UE (i) to receive a first signaling from a first cell, wherein the first signaling indicates first information of a second cell, (ii) to receive a second signaling from the first cell, wherein the second signaling indicates second information of the second cell, (iii) to consider one or more cells to be deactivated in response to receiving the second signaling, wherein the one or more cells are not indicated by the first information and/or the second information (e.g., the first information and/or the second information are not indicative of the one or more cells), and (iv) to perform a mobility procedure to the second cell in response to receiving the second signaling. Furthermore, the CPU 308 can execute the program code 312 to perform one, some and/or all of the above-described actions and steps and/or others described herein.

Figure 15:
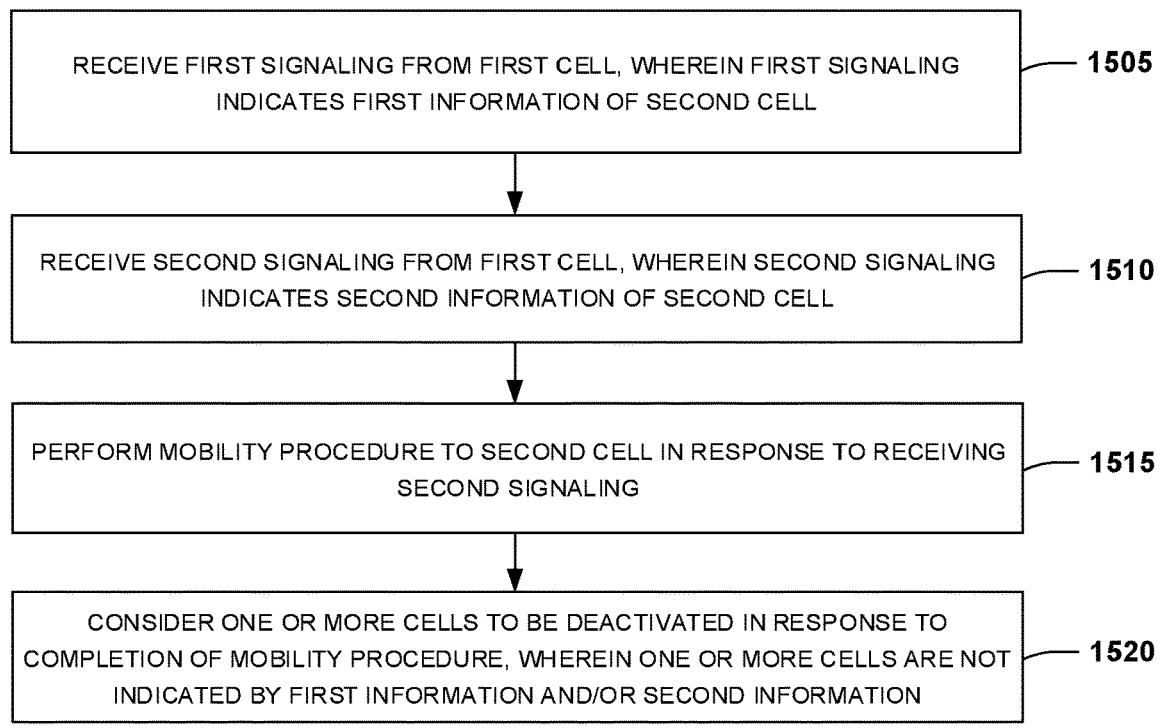
FIG. 15 is a flow chart according to one exemplary embodiment.

FIG. 15 is a flow chart 1500 according to one exemplary embodiment from the perspective of a UE. In step 1505, the UE receives a first signaling from a first cell, wherein the first signaling indicates first information of a second cell. In step 1510, the UE receives a second signaling from the first cell, wherein the second signaling indicates second information of the second cell. In step 1515, the UE performs a mobility procedure to the second cell in response to receiving the second signaling. In step 1520, the UE considers one or more cells to be deactivated (e.g., to be in deactivated state) in response to completion of the mobility procedure, wherein the one or more cells are not indicated by the first information and/or the second information (e.g., the first information and/or the second information are not indicative of the one or more cells). For example, the UE may consider the one or more cells to be deactivated based on a determination that the first information and/or the second information are not indicative of the one or more cells.

Referring back to FIGS. 3 and 4, in one exemplary embodiment of a UE, the device 300 includes a program code 312 stored in the memory 310. The CPU 308 may execute program code 312 to enable the UE (i) to receive a first signaling from a first cell, wherein the first signaling indicates first information of a second cell, (ii) to receive a second signaling from the first cell, wherein the second signaling indicates second information of the second cell, (iii) to perform a mobility procedure to the second cell in response to receiving the second signaling, and (iv) to consider one or more cells to be deactivated in response to completion of the mobility procedure, wherein the one or more cells are not indicated by the first information and/or the second information (e.g., the first information and/or the second information are not indicative of the one or more cells). Furthermore, the CPU 308 can execute the program code 312 to perform one, some and/or all of the above-described actions and steps and/or others described herein.

With respect to FIGS. 14-15, in one embodiment, the UE applies one or more configurations indicated by the first information in response to receiving the second signaling.

In one embodiment, the UE applies one or more configurations indicated by the first information in response to completion of the mobility procedure.

In one embodiment, the UE resets a MAC entity associated with the first cell in response to receiving the second signaling.

In one embodiment, the UE resets a MAC entity associated with the first cell in response to completion of the mobility procedure.

Figure 16:
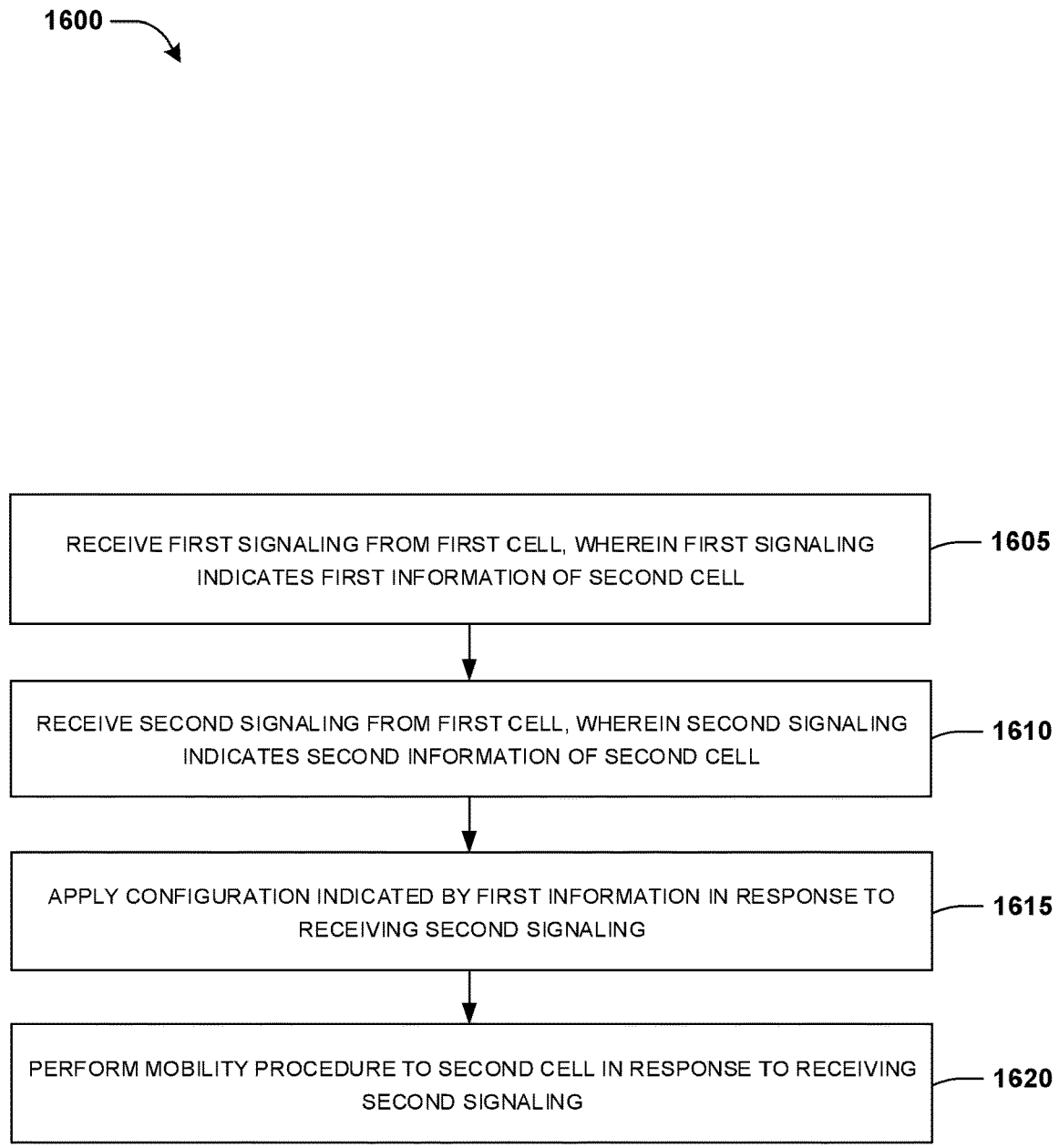
FIG. 16 is a flow chart according to one exemplary embodiment.

FIG. 16 is a flow chart 1600 according to one exemplary embodiment from the perspective of a UE. In step 1605, the UE receives a first signaling from a first cell, wherein the first signaling indicates first information of a second cell. In step 1610, the UE receives a second signaling from the first cell, wherein the second signaling indicates second information of the second cell. In step 1615, the UE applies (and/or uses) a configuration indicated by the first information in response to receiving the second signaling. The UE may use the configuration after the configuration is applied by the UE (and/or when the configuration is applied by the UE). In step 1620, the UE performs a mobility procedure to the second cell in response to receiving the second signaling.

Referring back to FIGS. 3 and 4, in one exemplary embodiment of a UE, the device 300 includes a program code 312 stored in the memory 310. The CPU 308 may execute program code 312 to enable the UE (i) to receive a first signaling from a first cell, wherein the first signaling indicates first information of a second cell, (ii) to receive a second signaling from the first cell, wherein the second signaling indicates second information of the second cell, (iii) to apply and/or use a configuration indicated by the first information in response to receiving the second signaling, and (iv) to perform a mobility procedure to the second cell in response to receiving the second signaling. Furthermore, the CPU 308 can execute the program code 312 to perform one, some and/or all of the above-described actions and steps and/or others described herein.

Figure 17:
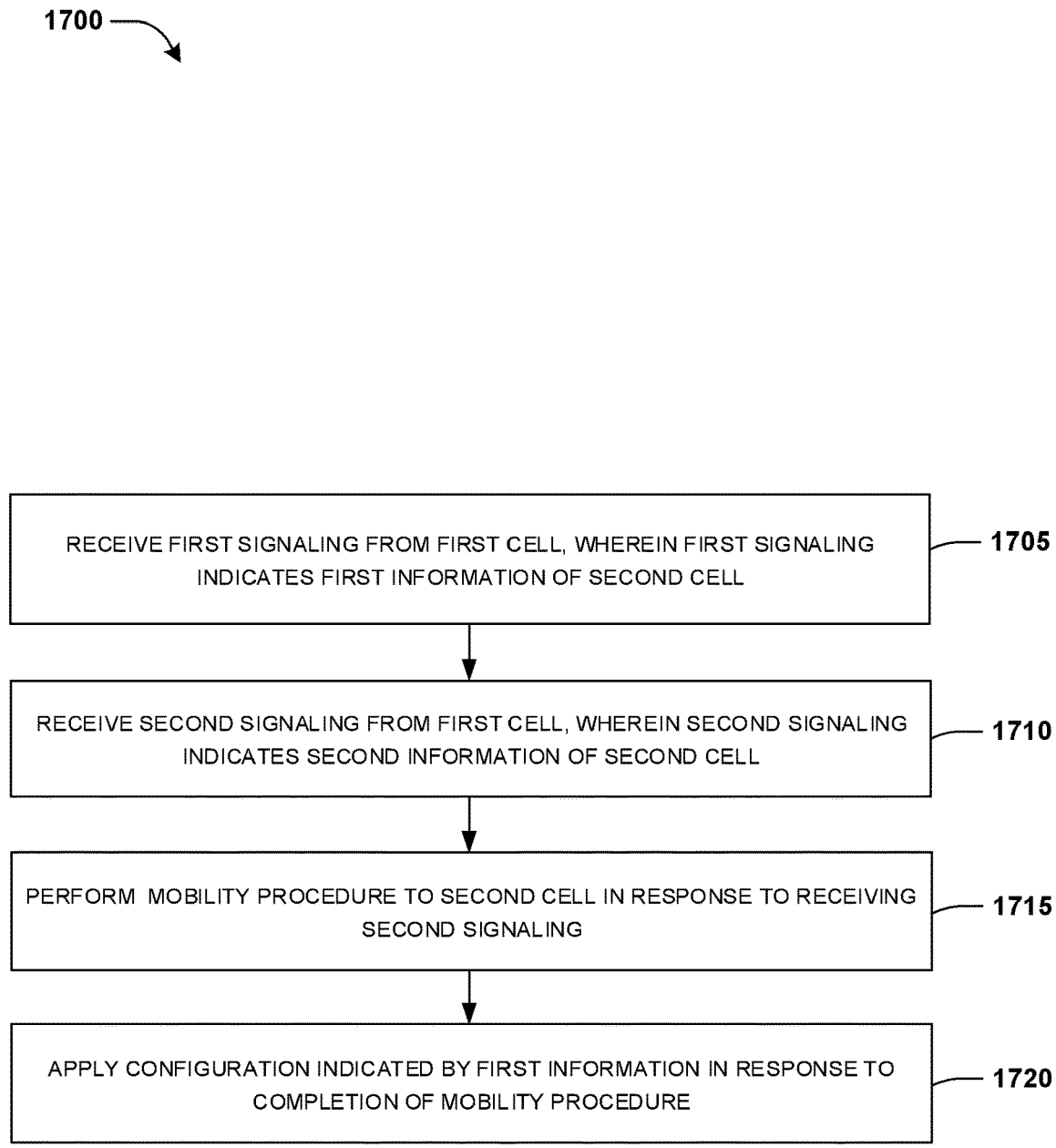
FIG. 17 is a flow chart according to one exemplary embodiment.

FIG. 17 is a flow chart 1700 according to one exemplary embodiment from the perspective of a UE. In step 1705, the UE receives a first signaling from a first cell, wherein the first signaling indicates first information of a second cell. In step 1710, the UE receives a second signaling from the first cell, wherein the second signaling indicates second information of the second cell. In step 1715, the UE performs a mobility procedure to the second cell in response to receiving the second signaling. In step 1720, the UE applies (and/or uses) a configuration indicated by the first information in response to completion of the mobility procedure.

Referring back to FIGS. 3 and 4, in one exemplary embodiment of a UE, the device 300 includes a program code 312 stored in the memory 310. The CPU 308 may execute program code 312 to enable the UE (i) to receive a first signaling from a first cell, wherein the first signaling indicates first information of a second cell, (ii) to receive a second signaling from the first cell, wherein the second signaling indicates second information of the second cell, (iii) to perform a mobility procedure to the second cell in response to receiving the second signaling, and (iv) to apply (and/or use) a configuration indicated by the first information in response to completion of the mobility procedure. Furthermore, the CPU 308 can execute the program code 312 to perform one, some and/or all of the above-described actions and steps and/or others described herein.

With respect to FIGS. 16-17, in one embodiment, the UE resets a MAC entity associated with the first cell in response to receiving the second signaling.

In one embodiment, the UE resets a MAC entity associated with the first cell in response to completion of the mobility procedure.

In one embodiment, the UE considers one or more cells to be deactivated in response to receiving the second signaling, wherein the one or more cells are not indicated by the first information and/or the second information (e.g., the first information and/or the second information are not indicative of the one or more cells).

In one embodiment, the UE considers one or more cells to be deactivated in response to completion of the mobility procedure, wherein the one or more cells are not indicated by the first information and/or the second information (e.g., the first information and/or the second information are not indicative of the one or more cells).

With respect to FIGS. 12-17, in one embodiment, the first cell initiates and/or triggers the mobility procedure of the UE by transmitting the second signaling.

In one embodiment, the UE does not perform a mobility procedure to the second cell in response to receiving the first signaling.

In one embodiment, the mobility procedure comprises the UE performing one or more uplink transmissions transmitting a third signaling to the second cell via one or more uplink resources indicated by the first or the second information (e.g., the third signaling is transmitted to the second cell via the one or more uplink transmissions).

In one embodiment, the mobility procedure comprises the UE performing a random access procedure to the second cell.

In one embodiment, the mobility procedure comprises the UE triggering and/or generating the third signaling (e.g., the UE may trigger and/or generate the third signaling for transmission to the second cell).

In one embodiment, the third signaling is a mobility completion message.

In one embodiment, the mobility procedure comprises the UE considering the second cell to be a SpCell.

In one embodiment, the UE considers the second cell to be a PCell in response to completion of the mobility procedure.

In one embodiment, the UE considers the second cell to be a PCell in response to reception of an acknowledgement (e.g., a positive acknowledgement) from the second cell, wherein the acknowledgement is associated with the third signaling (e.g., the acknowledgment may be indicative of successful reception of the third signaling).

In one embodiment, the UE considers the second cell to be a PCell in response to completion of a random access procedure.

In one embodiment, the UE considers the second cell to be a PCell in response to receiving the second signaling.

In one embodiment, the UE considers the mobility procedure to be complete (e.g., completion of the mobility procedure) upon (and/or in response to) reception of an acknowledgement (e.g., a positive acknowledgement) from the second cell, wherein the acknowledgement is associated with the third signaling (e.g., the acknowledgment may be indicative of successful reception of the third signaling).

In one embodiment, the UE considers the mobility procedure to be complete (e.g., completion of the mobility procedure) upon (and/or in response to) completion of a random access procedure associated with the mobility procedure.

In one embodiment, the first signaling is a RRC message.

In one embodiment, the first signaling indicates an identity of the second cell (e.g., the first signal may be indicative of a serving cell index of the second cell and/or a physical cell identity of the second cell).

In one embodiment, the first signaling comprises one or more uplink configurations of the second cell.

In one embodiment, the first signaling comprises one or more downlink configurations of the second cell.

In one embodiment, the first signaling comprises beam information (e.g., uplink beam information and/or downlink beam information) of the second cell.

In one embodiment, the first signaling comprises one or more cell configurations of the second cell.

In one embodiment, the first signaling comprises one or more uplink resources of the second cell for the UE.

In one embodiment, the second signaling is a DCI.

In one embodiment, the second signaling is not a RRC message.

In one embodiment, the second signaling is a MAC CE.

In one embodiment, the second signaling indicates an identity and/or an index of the second cell.

In one embodiment, the second signaling indicates one or more uplink resources for one or more transmissions to the second cell.

In one embodiment, the one or more uplink resources comprise one or more PUCCH resources and/or one or more PUSCH resources.

In one embodiment, the one or more uplink resources comprise timing advanced information for one or more uplink transmissions to the second cell.

In one embodiment, the one or more uplink resources indicate a starting frame (and/or a starting sub-frame) for one or more uplink transmissions to the second cell.

In one embodiment, the second cell is a neighboring cell of the UE.

In one embodiment, the second cell is a serving cell of the UE.

In one embodiment, the second cell is an activated serving cell of the UE.

In one embodiment, the second cell is a deactivated serving cell of the UE.

In one embodiment, the third signaling is a PUCCH transmission and/or a PUSCH transmission.

In one embodiment, the third signaling indicates an RNTI value of the UE, wherein the RNTI value is provided by the first cell via the first information and/or via the second information (e.g., the first information and/or the second information may be indicative of the RNTI value).

In one embodiment, the third signaling is a Scheduling request.

In one embodiment, the third signaling is a CSI report.

In one embodiment, the third signaling is a MAC CE.

In one embodiment, the acknowledgement from the second cell is a PDCCH signaling.

Figure 18:
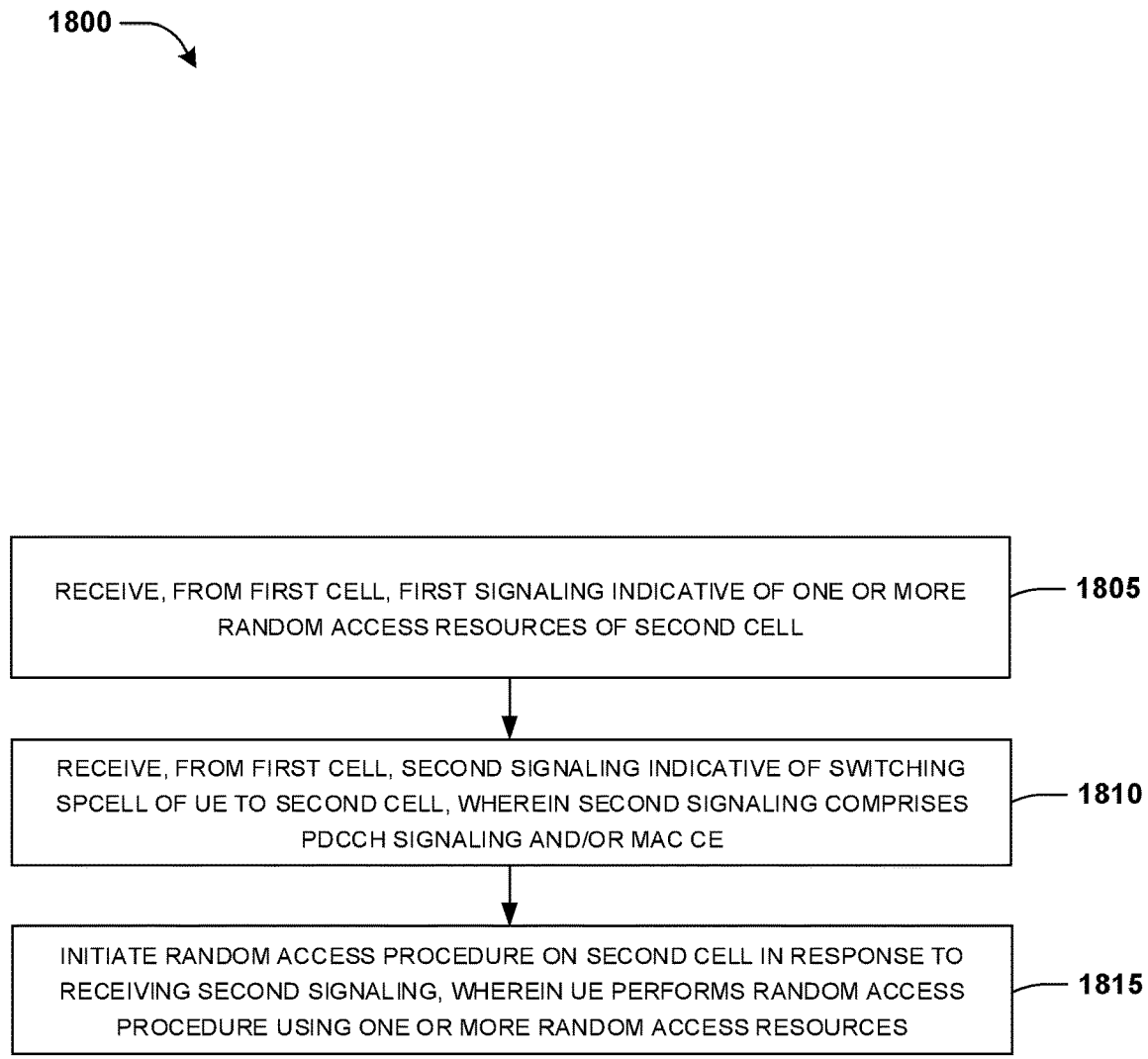
FIG. 18 is a flow chart according to one exemplary embodiment.

FIG. 18 is a flow chart 1800 according to one exemplary embodiment from the perspective of a UE. In step 1805, the UE receives, from a first cell, a first signaling indicative of one or more random access resources of a second cell (and/or indicative of other information in addition to the one or more random access resources of the second cell). In step 1810, the UE receives, from the first cell, a second signaling indicative of switching a SpCell of the UE to the second cell, wherein the second signaling comprises a PDCCH signaling (e.g., a signaling transmitted via PDCCH) and/or a MAC CE. In an example, the second signaling may be transmitted to the UE to switch the SpCell of the UE to the second cell. Alternatively and/or additionally, the second signaling may indicate to (and/or instruct) the UE to switch the SpCell of the UE to the second cell. In step 1815, the UE initiates a random access procedure on the second cell in response to receiving the second signaling, wherein the UE performs the random access procedure using the one or more random access resources indicated by the first signaling.

In one embodiment, the first signaling comprises (and/or is) a RRC message.

In one embodiment, the first signaling is indicative of a cell configuration of the second cell, an identity associated with the second cell, an index associated with the second cell and/or a C-RNTI that is for the UE and for the second cell. For example, the identity may comprise a cell identity (e.g., a physical cell identity) of the second cell. Alternatively and/or additionally, the index may comprise a cell index (e.g., a serving cell index) of the second cell. Alternatively and/or additionally, the C-RNTI may be used by the UE to communicate with the second cell.

In one embodiment, the second signaling is indicative of an identity associated with the second cell, an index associated with the second cell, a C-RNTI that is for the UE and for the second cell, a preamble index associated with the random access procedure and/or a reference signal index associated with the second cell. For example, the identity may comprise a cell identity (e.g., a physical cell identity) of the second cell. Alternatively and/or additionally, the index may comprise a cell index (e.g., a serving cell index) of the second cell. Alternatively and/or additionally, the C-RNTI may be used by the UE to communicate with the second cell.

In one embodiment, the UE performs the random access procedure based on a reference signal (e.g., a SSB or a CSI-RS, such as described in 3GPP TS 38.321) associated with the reference signal index.

In one embodiment, the one or more random access resources comprise a random access preamble, reference signal information and/or one or more PRACH occasions associated with the second cell.

In one embodiment, the UE considers the second cell to be the SpCell in response to receiving the second signaling or in response to completion of the random access procedure. For example, the UE may switch the SpCell of the UE (from a cell different than the second cell) to the second cell in response to receiving the second signaling or in response to completion of the random access procedure.

In one embodiment, the second cell is a neighboring cell of the UE before the SpCell of the UE is switched to the second cell. Alternatively and/or additionally, the second cell may be a neighboring cell of the UE when (and/or before and/or after) the UE receives the first signaling. Alternatively and/or additionally, the second cell may be a neighboring cell of the UE when (and/or before and/or after) the UE receives the second signaling. Alternatively and/or additionally, the second cell may remain a neighboring cell of the UE until the SpCell of the UE is switched to the second cell.

In one embodiment, the SpCell is a PCell or a PSCell.

In one embodiment, in response to receiving the second signaling, the UE generates a message for transmission to the second cell.

Referring back to FIGS. 3 and 4, in one exemplary embodiment of a UE, the device 300 includes a program code 312 stored in the memory 310. The CPU 308 may execute program code 312 to enable the UE (i) to receive, from a first cell, a first signaling indicative of one or more random access resources of a second cell, (ii) to receive, from the first cell, a second signaling indicative of switching a SpCell of the UE to the second cell, wherein the second signaling comprises a PDCCH signaling and/or a MAC CE, and (iii) to initiate a random access procedure on the second cell in response to receiving the second signaling, wherein the UE performs the random access procedure using the one or more random access resources. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 10-18. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 10-18, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a network node). The increased efficiency may be a result of enabling the UE to handle Layer-1 and/or Layer-2 (L1/L2) mobility procedures using one or more of the techniques provided herein (e.g., using one or more of the configurations and/or one or more of the procedures provided herein). Alternatively and/or additionally, the increased efficiency may be due to reducing latency for performing handover via Layer-1 and/or Layer-2 (L1/L2) mobility procedure.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based on design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), the method comprising:
   receiving, from a first cell, a first signaling indicative of one or more random access resources of a second cell;
   receiving, from the first cell, a second signaling indicative of switching a Special Cell (SpCell) of the UE to the second cell, wherein the second signaling comprises a Medium Access Control (MAC) Control Element (CE); and
   in response to receiving the second signaling from the first cell:
      applying a Cell Radio Network Temporary Identifier (C-RNTI) for the second cell, wherein the C-RNTI, applied for the second cell to which the SpCell is indicated to be switched to, is indicated by the first signaling received from the first cell; and
      initiating a random access procedure on the second cell, wherein the random access procedure is performed by the UE using at least one of the one or more random access resources indicated in the first signaling received by the UE from the first cell.

2. The method of claim 1, comprising:
resetting a MAC entity in response to receiving the second signaling.

3. The method of claim 1, wherein:
the first signaling is indicative of at least one of a cell configuration of the second cell, a measurement configuration of the second cell, an identity associated with the second cell, an index associated with the second cell or a dedicated preamble for the UE to use on the second cell.

4. The method of claim 1, wherein:
the second signaling is indicative of at least one of an identity associated with the second cell, an index associated with the second cell, a preamble index associated with the random access procedure or a reference signal index associated with the second cell.

5. The method of claim 4, wherein:
the random access procedure is performed by the UE based on a reference signal associated with the reference signal index.

6. The method of claim 1, wherein:
the one or more random access resources comprise at least one of a random access preamble, reference signal information or one or more Physical Random Access Channel (PRACH) occasions associated with the second cell.

7. The method of claim 1, comprising:
considering the second cell to be the SpCell in response to receiving the second signaling or in response to completion of the random access procedure.

8. The method of claim 1, comprising:
applying one or more configurations indicated by the first signaling in response to receiving the second signaling.

9. The method of claim 1, comprising:
in response to receiving the first signaling, applying a Channel State Information (CSI) reporting configuration associated with the second cell.

10. The method of claim 1, comprising:
in response to receiving the second signaling, generating a Radio Resource Control (RRC) message for transmission to the second cell.

11. The method of claim 1, comprising:
not considering the second cell to be the SpCell based upon receiving a Physical Downlink Control Channel (PDCCH) order initiating a second random access procedure associated with the second cell.

12. The method of claim 1, wherein the second signaling does not comprise information received by the first cell from the second cell.

13. A User Equipment (UE), comprising:
a control circuit;
a processor installed in the control circuit; and
a memory installed in the control circuit and operatively coupled to the processor, wherein the processor is configured to execute a program code stored in the memory to perform operations, the operations comprising:
   receiving, from a first cell, a first signaling indicative of one or more random access resources of a second cell;
   receiving, from the first cell, a second signaling indicative of switching a Special Cell (SpCell) of the UE to the second cell, wherein the second signaling comprises a Medium Access Control (MAC) Control Element (CE); and in response to receiving the second signaling from the first cell:

applying a Cell Radio Network Temporary Identifier (C-RNTI) for the second cell, wherein the C-RNTI, applied for the second cell to which the SpCell is indicated to be switched to, is indicated by the first signaling received from the first cell; and initiating a random access procedure on the second cell, wherein the random access procedure is performed by the UE using at least one of the one or more random access resources indicated in the first signaling received by the UE from the first cell.

14. The UE of claim 13, comprising:
resetting a MAC entity in response to receiving the second signaling.

15. The UE of claim 13, wherein:
the first signaling is indicative of at least one of a cell configuration of the second cell, a measurement configuration of the second cell, an identity associated with the second cell, an index associated with the second cell or a dedicated preamble for the UE to use on the second cell.

16. The UE of claim 13, wherein:
the second signaling is indicative of at least one of an identity associated with the second cell, an index associated with the second cell, a preamble index associated with the random access procedure or a reference signal index associated with the second cell.

17. The UE of claim 16, wherein:
the random access procedure is performed by the UE based on a reference signal associated with the reference signal index.

18. The UE of claim 13, wherein:
the one or more random access resources comprise at least one of a random access preamble, reference signal information or one or more Physical Random Access Channel (PRACH) occasions associated with the second cell.

19. The UE of claim 13, the operations comprising:
in response to receiving the first signaling, applying a Channel State Information (CSI) reporting configuration associated with the second cell.

20. The UE of claim 13, the operations comprising:
applying one or more configurations indicated by the first signaling in response to receiving the second signaling.

21. The UE of claim 13, the operations comprising:
in response to receiving the second signaling, generating a Radio Resource Control (RRC) message for transmission to the second cell.

22. A non-transitory computer-readable medium comprising processor-executable instructions that when executed by a User Equipment (UE) cause performance of operations, the operations comprising:

receiving, from a first cell, a first signaling indicative of one or more random access resources of a second cell;

receiving, from the first cell, a second signaling indicative of switching a Special Cell (SpCell) of the UE to the second cell, wherein the second signaling comprises a Medium Access Control (MAC) Control Element (CE); and in response to receiving the second signaling from the first cell:

applying a Cell Radio Network Temporary Identifier (C-RNTI) for the second cell, wherein the C-RNTI, applied for the second cell to which the SpCell is indicated to be switched to, is indicated by the first signaling received from the first cell; and initiating a random access procedure on the second cell, wherein the random access procedure is performed by the UE using at least one of the one or more random access resources indicated in the first signaling received by the UE from the first cell.

* * * * *